US012155724B2

(12) United States Patent
Rodinger et al.

(10) Patent No.: US 12,155,724 B2
(45) Date of Patent: Nov. 26, 2024

(54) TRANSPORT METHOD IN HIERARCHICAL DATA NETWORK

(71) Applicant: NANOGRID LIMITED, Kowloon (HK)

(72) Inventors: Tomas Rodinger, Vancouver (CA); Yi Guo, Shenzhen (CN); Anders Ohrn, Vancouver (CA)

(73) Assignee: NANOGRID LIMITED, Kowloon (HK)

( * ) Notice: Subject to any disclaimer, the term of this patent is extended or adjusted under 35 U.S.C. 154(b) by 343 days.

(21) Appl. No.: 16/960,022

(22) PCT Filed: Jan. 4, 2019

(86) PCT No.: PCT/CA2019/050012
§ 371 (c)(1),
(2) Date: Jul. 3, 2020

(87) PCT Pub. No.: WO2019/134046
PCT Pub. Date: Jul. 11, 2019

(65) Prior Publication Data
US 2021/0067440 A1 Mar. 4, 2021

Related U.S. Application Data

(60) Provisional application No. 62/613,505, filed on Jan. 4, 2018.

(51) Int. Cl.
H04L 67/12 (2022.01)
H04L 41/12 (2022.01)
(Continued)

(52) U.S. Cl.
CPC .............. H04L 67/12 (2013.01); H04L 41/12 (2013.01); H04L 45/48 (2013.01); H05B 45/20 (2020.01);
(Continued)

(58) Field of Classification Search
CPC ........ H05B 45/20; H05B 47/19; H05B 47/18; H05B 47/105; H05B 47/115; H04L 67/12;
(Continued)

(56) References Cited

U.S. PATENT DOCUMENTS 6,738,379 B1* 5/2004 Balazinski ............ H04L 69/161
370/413
8,239,421 B1* 8/2012 Marwah .................. H03M 7/30
382/248

(Continued)

FOREIGN PATENT DOCUMENTS

WO WO-2013159831 A1 * 10/2013 ......... H05B 37/0227
WO 2017089199 A1 6/2017
(Continued)

OTHER PUBLICATIONS

Burst-Mode Resonant LLC Converter for an LED Luminaire With Integrated Visible Light Communication for Smart Buildings Shuze Zhao;Jiale Xu;Olivier Trescases IEEE Transactions on Power Electronics Year: 2014 | vol. 29, Issue: 8 | Journal Article | Publisher: IEEE (Year: 2014).*

(Continued)

Primary Examiner — Suraj M Joshi
Assistant Examiner — Ayele F Woldemariam
(74) Attorney, Agent, or Firm — OPES IP Consulting Co. Ltd.

(57) ABSTRACT

Embodiments of the present disclosure generally relate to the field of electronic data communications, and more specifically to transport methods for hierarchical data networks in relation to providing "address-less data transport" of data packets. An order is introduced or associated with nodes to establish relationships, and the order may be stored in the form of a tree topology in a data structure. The order of
(Continued)

nodes is thus known, and logic and/or other data sets, data payloads, etc., may be transmitted across the nodes, wherein the steps to execute the transmission are more efficient due to the properties of the ordered nodes. Each node in the plurality of nodes is comprised of a plurality of network interfaces, which through pairwise joining, forms a data network of a tree topology.

20 Claims, 12 Drawing Sheets

(51) Int. Cl.
　　*H04L 45/48*　　　(2022.01)
　　*H05B 45/20*　　　(2020.01)
　　*H05B 47/105*　　(2020.01)
　　*H05B 47/115*　　(2020.01)
　　*H05B 47/18*　　　(2020.01)
　　*H05B 47/19*　　　(2020.01)
(52) U.S. Cl.
　　CPC ........... *H05B 47/105* (2020.01); *H05B 47/18* (2020.01); *H05B 47/19* (2020.01); *H05B 47/115* (2020.01)
(58) Field of Classification Search
　　CPC ......... H04L 41/12; H04L 45/48; H04L 12/44; H04L 12/66; H04L 43/50; H04L 45/00; H04L 67/22
　　USPC ...................................................... 709/220
　　See application file for complete search history.

(56) References Cited

U.S. PATENT DOCUMENTS

| | | |
|---|---|---|
| 8,515,289 B2 | 8/2013 | Maxik et al. |
| 2005/0068954 A1 | 3/2005 | Liu et al. |
| 2007/0053298 A1* | 3/2007 | Ke .......... H04L 45/10 370/236.2 |
| 2007/0067678 A1* | 3/2007 | Hosek ................ G05B 23/0235 714/25 |
| 2007/0083289 A1* | 4/2007 | Russell ............. G05B 19/4207 901/1 |
| 2009/0045971 A1* | 2/2009 | Simons ................. H05B 47/19 340/9.16 |
| 2011/0255421 A1 | 10/2011 | Shrirang et al. |
| 2012/0096181 A1* | 4/2012 | Petrus .................... H04L 45/28 709/239 |
| 2015/0115806 A1 | 4/2015 | Helmut et al. |
| 2016/0330825 A1* | 11/2016 | Recker ................ H05B 47/115 |
| 2016/0359950 A1* | 12/2016 | Reddy .................... H04L 67/06 |
| 2017/0168901 A1* | 6/2017 | Tsao .................... G06F 11/1461 |
| 2017/0223648 A1* | 8/2017 | Shin .................... H04W 56/005 |
| 2017/0276786 A1* | 9/2017 | Smith ................. G01S 13/9021 |
| 2017/0358111 A1* | 12/2017 | Madsen ................ H04L 41/12 |
| 2018/0091416 A1* | 3/2018 | Ghosh ................... H04L 45/123 |
| 2018/0376566 A1* | 12/2018 | Newton ................ H05B 45/20 |

FOREIGN PATENT DOCUMENTS

| | | | |
|---|---|---|---|
| WO | WO-2017091349 A1 * | 6/2017 | ............ G08C 17/02 |
| WO | 2017181291 A1 | 10/2017 | |

OTHER PUBLICATIONS

Burst-Mode Resonant LLC Converter for an LED Luminaire With Integrated Visible Light Communication for Smart Buildings Shuze Zhao;Jiale Xu;Olivier Trescases IEEE Transactions on Power Electronics Year: 2014 | vol. 29, Issue: 8 | Journal Article | Publisher: IEEE (Year: 2014) (Year: 2014).*

ISR, WO prepared by ISA/CA, submitted as "documents submitted with 371 applications".

Extended European search report from the EPO, Aug. 12, 2024.

* cited by examiner

TRANSPORT METHOD IN HIERARCHICAL DATA NETWORK

FIELD

Embodiments of the present disclosure generally relate to the field of electronic data communications, and more specifically to transport methods for hierarchical data networks.

INTRODUCTION

A plurality of nodes, wherein each node is connected to at least one other node of the plurality through a communication medium able to transmit data, is a data network.

A data network can be a plurality of computers in an office joined to a common data server. The joining can be done through a networking cable, such as optical fiber cables, coaxial cables or twisted pair cables. The means of joining nodes in the network can be wireless, through the transmission of electromagnetic waves at some frequency, such as 2.4 GHz or 5 GHz, where an antenna coupled to the computer or data server sends or receives the electromagnetic waves. The plurality of nodes can be comprised of other types of devices, such as printers, video cameras, phones, step trackers, motion sensors, thermometers and any type of sensor, which can be programmed to generate and transmit digital data through a communication medium.

A data network can be a plurality of sensors that are installed throughout cars in order to sense through one or a plurality of physical interactions with the surrounding some property of said surrounding and thus determine the amount of gas left in the tank, the temperature of the engine, speed, if seat-belts are fastened or many other properties. The nodes of these networks can also include actuators, which are devices able to perform a function or activity. In the case of cars this can be warning lamps that illuminate if one or more logical conditions are met with respect to one or more sensor, such as shortage of gas, or a gradual hydraulic opening or closing of the trunk in case a button has been pressed. As cars are operated, data transmissions can have to be of very high priority in order to promptly alert of changing conditions. The plurality of sensors and actuators can transmit signals on a common communication medium, such as a wire. Hence, there is a risk that data signals interfere with each other unless contention for the communication medium is handled.

A data network can be comprised of sensors and actuators that are installed in so called smart homes, or smart offices, or smart retail spaces. Examples of such sensors are thermometers, motion sensors, ambient light sensors, sensors that tell if a door is open or closed, smoke sensors, carbon monoxide sensors, audio transducers. Examples of such actuators are cameras, lamps and luminaires, window openers, window blinds, wireless electrical outlets, smart fridges, alarm clocks. Many of these sensors are small and can mechanically be installed throughout the home, office or retail space. Because of their wide spatial distribution, it can be possible to install them without any wire attached. That can imply the sensors and actuators have to connect to the data network through wireless means. That can further imply the sensors and actuators have to be powered without direct connection to an electrical socket. The latter can be solved by installing a replaceable battery. Batteries can only supply a finite amount of energy before they have to be replaced.

Devices that consume as little energy as possible are desirable. The wireless communication furthermore implies that other devices with an appropriately tuned antenna, not part of the network, can receive the data transmitted to and from the sensors and actuators. That raises security concerns, since data can be private, proprietary or otherwise not intended for a third-party. Furthermore, for installations that span a larger area, the range within which nodes can reliably and at adequate speeds communicate can approach or exceed the dimensions of the installed data network.

SUMMARY

Embodiments are described in various embodiments, relating methods to transport data throughout a data network of nodes, wherein the nodes can be both actuators and sensors, where the methods are such that a minimum of time and design complexity are required to execute a desired transport, given a computing hardware.

The methods are implemented on electronic circuitry, which can include, in various embodiments, physical circuits, electronic pathways, and electronic interfaces for transmitting data and/or power. In some embodiments, non-transitory computer readable media are also contemplated, which store machine-translatable instructions that cause a processor to perform steps of various methods described herein.

The mechanisms described herein are in relation to "address-less data transport", which, among others, provides a technical solution to a technical problem in the field of data transport. Without addresses, relationships are established to provide electronic pathways for transmission of power and/or data packets.

Methods to transport data providing "address-less data transport" are described herein using various approaches to implementation using hardware, software, embedded firmware, circuitry, and/or combinations thereof.

An order is introduced or associated with the nodes to establish relationships, and the order may be stored in the form of a tree topology in a data structure. The order of nodes is thus known, and logic and/or other data sets, data payloads, etc., may be transmitted across the nodes.

In an embodiment, there is provided a method for transporting a plurality of data arrays in a data network comprising a plurality of nodes, and comprising a plurality of connections between nodes. Each node in the plurality of nodes is comprised of a plurality of network interfaces through which data arrays are sent and received, and the connections between nodes of the plurality of nodes are formed through pairwise joining of a plurality of network interfaces of the nodes, such that the network topology of the connections is a tree topology.

The method for transporting data includes: assigning a first order (e.g. a first ordinal relation) to the plurality of network interfaces for all nodes in the plurality of nodes; determining a second order (e.g. a second ordinal relation) for the plurality of nodes as a function of a network topology and the first order for the plurality of network interfaces; and generating a first composite data array by a concatenation of a plurality of data arrays, such that a first and a second data array in the first composite data array are in an equivalent order to each other as a corresponding pair of nodes in the second order.

The orders are in relation to the network interfaces of any given node are in. That means, the first order makes statements such as: "select the first network interface" or "select the next network interface" unambiguous and for any specific data network installation persistent. This is an important consideration for connecting address-less nodes, especially for modular electronics having multiple connectable interfaces where it is not known ahead of time which connections will connect with which, and in what order (e.g. a user is assembling a geometric shape using modular LED panels and would like to be able to conveniently connect them without regard to matching specific panel interfaces or establishing and communicating the shape to a central controller). The second order is similarly an order of the nodes of any given data network. One important consideration is to derive or determine the second order. That is done on basis of two other properties of the data network: the precise tree topology of the data network, as well as the first order for the nodes comprising the data network. With the second order in place, the transport of the composite data array method exploits the determined second order for efficient transport.

The content of a first composite data array is transmitted throughout the data network, such that each node receives from at least one other node connected through a first network interface, a first contiguous sequence of the first composite data array, and such that each node sends to other nodes connected to it through a second network interface, a second contiguous sequence of the first composite data array, wherein the second contiguous sequence is constructed from the first contiguous sequence as a function of the first and second order.

A first contiguous sequence of the composite data array is created. The significance of the word "contiguous" is that (1) the sequence is ordered and (2) that it overlaps with one stretch of the content of the first composite data array. The first contiguous sequence can therefore be obtained by simply defining one lower bound and one upper bound to be applied to the content of the first composite data array.

This process can continue recursively, according to some embodiments. A second contiguous sequence is constructed from the first contiguous sequence by applying the same type of minimal set operations, which will, in effect, decompose the first composite data array (or the ordered content comprising the first composite data array, if that is a preferable way to formulate it), into contiguous sequences.

In addition, this plurality of contiguous sequences are for one given node, overlapping or non-overlapping. In other words, any single unit of content of the first composite data array that has been received through a first network interface of a given node, defined as a unit of content $\Omega$, will only be sent through at most one other network interface of the same given node. It is possible it is sent through no network interface, since this unit of content can be intended to be consumed by the one given node.

In another aspect, the function relating the first and second contiguous sequences of the first composite data array comprises, splitting the first contiguous sequence into overlapping or non-overlapping sequences, equal or greater in number than the number of connected network interfaces of the node, and assigning the second contiguous sequence as the overlapping or non-overlapping sequence in an equivalent order relative (e.g. in accordance with an equivalent order relation) to the other overlapping or non-overlapping sequences as the second network interface to the other network interfaces in the first order.

In another aspect, the function relating the first and second contiguous sequences of the first composite data array comprises aggregating overlapping or non-overlapping sequences of data arrays, equal or greater in number than the number of connected network interfaces of the node, wherein the second contiguous sequence is the overlapping or non-overlapping sequence in an equivalent order relative to the other overlapping or non-overlapping sequences as the second network interface to the other network interfaces in the first order, and assigning the aggregated sequences as the first contiguous sequence.

In another aspect, the method includes generating/creating an acknowledgement message after the sending of all contiguous sequences through the connected second network interfaces is complete, and sending the acknowledgement message through the first network interface of the node.

In another aspect, at least one node of the plurality of nodes pauses further execution of the transmission after sending a second contiguous sequence through a second network interface until at least one acknowledgement message is received through the same second network interface, such that further execution of the transmission becomes conditional on successful transport to nodes prior in the determined order of the plurality of nodes.

In another aspect, an error message is generated if a node of the data network fails to receive within a time threshold at least one acknowledgement message subsequent to the sending of a second contiguous sequence.

In another aspect, the determined second order is obtained once for a data network, and is stored in memory (e.g. data storage or non-transitory computer readable media), such that the determined second order is retrieved from memory during the creation of the first composite data array and transmission of the first composite data array.

In another aspect, the determined second order is obtained at a frequency less than or equal to four times a second for a data network, and is stored at a location in memory, such that the current determined second order is retrieved from memory during the creation of the first composite data array and its transmission.

In another aspect, the network interfaces are comprised of serial ports arranged in a geometrical relation each node of the plurality of nodes.

In another aspect, the number of serial ports per node of the plurality of nodes is equal to three.

In another aspect, the number of serial ports per node of the plurality of nodes is equal to four.

Other numbers of serial ports are possible, and may, for example, vary depending on a number of sides of a modular electrical component (e.g. an LED luminaire). For example, such modular electrical component may include triangular, rectangular, pentagonal, hexagonal, heptagonal, octagonal, nonagonal, decagonal, etc. panels, and a portion or each of the sides of such panels may include interfaces which need ordering assigned for improved data transport. In some embodiments, there may also be one or more sides that do not have interfaces (e.g. a hexagonal module does not necessarily have six interfaces).

In another aspect, the order of the network interfaces of each node of the plurality of nodes corresponds to a clockwise traversal of the geometrical relation of the serial ports.

In another aspect, the order of the network interfaces of each node of the plurality of nodes corresponds to a counter-clockwise traversal of the geometrical relation of the serial ports.

In another aspect, the nodes of the plurality of nodes are further comprised of digital or analog sensors to sense one or more states of the node or the environment of the node, and wherein the sensed states are digitally represented as data arrays forming part of the first composite data array transmitted in the data network.

In another aspect, the state sensed by the node of the plurality of nodes is the presence or absence of an object in the close proximity of the node.

In another aspect, the state sensed by the node is motion of an object within a path through air (e.g. 10, 15, 20, 25 meters) from the digital or analog sensor.

In another aspect, the nodes are further comprised of physical actuators (e.g. drive current flow) that are actuated such that one or more states of the components are set as a function of parts of the content of the first composite data array received by the node through one or more of its network interfaces.

In another aspect, the actuation of the node is the setting of drive currents for a plurality of light-emitting diodes.

In another aspect, the tree topology of the network topology is determined as a spanning tree of all network interface connections, such that the connections of the spanning tree is a subset of all network interface connections.

In another aspect, there is provided a method for transporting a data array in a data network comprising a plurality of nodes, and comprising a plurality of connections between nodes, wherein the data array transport is from one source node to one target node in the plurality of nodes; each node in the plurality of nodes is comprised of a plurality of network interfaces through which data arrays are sent and received, the connections between nodes of the plurality of nodes are formed through pairwise joining of a plurality of network interfaces of the nodes, such that the network topology of the connections is a tree topology. In this method, the method includes:

assigning a first order to the plurality of network interfaces for all nodes in the plurality of nodes; determining a second order for the plurality of nodes as a function of a network topology and the first order for the plurality of network interfaces; generating a first composite data array from a first data array and a first integer and a second integer, wherein the first integer is set as a function of the place of either the source node or target node within the determined order; and transmitting the content of the first composite data array throughout the data network, such that a node receives the first composite data array through a first network interface, and sends the first composite data array through a second network interface only if the addition of the second integer of the first composite data array and the number of nodes contained in the branch of the tree data network topology connected to the node through the second network interface exceeds the value of the first integer of the first composite data array. The second network interface is iteratively selected from the first order to the plurality of network interfaces for a node, and wherein the second integer of the first composite data array is incremented by the number of nodes contained in the branch of the tree data network topology connected to the node through the second network interface if the composite data array is not sent through the second network interface.

In another aspect, a corresponding a data network comprising a plurality of nodes, and a plurality of connections between nodes, the plurality of nodes of the data network adapted for transport of data arrays throughout the data network is contemplated in accordance to various methods described in embodiments herein.

In another aspect, a corresponding computer readable medium storing machine interpretable instructions, which when executed by a processor, cause the processor to perform a method described in embodiments herein is provided.

In another aspect, the method for data transport is conducted on a physical computing system controlling address-less modular electronic devices. These address-less modular electronic devices, for example, can be dynamically connected in various geometries at one or more connection points at each of the modular electronic devices. The modular electronic devices include communication circuitry, which can be considered "nodes", and utilize various mechanisms for data transport described herein for transmitting power, data, and combinations thereof. For example, the modular electronic devices can be a luminaire or a luminaire controller circuit, and the transmission of the composite data array is utilized during propagation of control messages across the plurality of nodes, which can be adapted for controlling characteristics of operation of the luminaire or the luminaire controller circuit in accordance to display of different types of graphical designs, among others. As described in further detail, the data transport methods are potentially beneficial in establishing efficient communication and propagation of data messages through address-less modular devices.

More specifically, in an example embodiment, the method for data transport is used for propagating data packets storing control messages indicating, among others, drive currents that actuate display changes or light emissions from the luminaire or the luminaire controller circuit.

In an embodiment, information is sent via the nodes and their connections by way of data payloads that include a portion for forwarding and a portion for execution. Improved data structures are described with a reduced overhead required for forwarding, resulting in potential improved efficiency.

The methods are applicable to data networks that are of the tree topology, which also covers the star and line topologies. Because any network that connects a first plurality of nodes via a first plurality of node-to-node connection can be made into a network that connects the same first plurality of nodes, but with a second plurality of node-to-node connections that is a subset of the first plurality of connections, wherein the second plurality of connections are of a tree topology (method called finding spanning trees in prior art), the transport method can, subsequent to a disclosed pre-processing, be used to transport data between any plurality of generally interconnected nodes. Embodiments are not limited to networks of the tree topology, rather to various topologies, since given that pre-processing can always create a spanning tree.

An order is imposed on the network. The tree topology enables an order to be clearly defined. With a predictable order at hand, a composite data array, comprised of data arrays with data for a certain node in the network, can be constructed such that the nodes receive their data array without any other necessary logical operations executed on each node than the forwarding of a set number of the composite data arrays via an ordered set of network interfaces of any given node.

An unconventional approach is described in various embodiments with respect to the combination of a topological sorting and the logical executions that divide or construct the composite data array, such that a location within the composite data array is uniquely associated, without additional indexing, to a node in the data network. The method is a non-trivial technical implementation of graph theory approaches to solve technical problems for practical, physical electronic devices.

In an embodiment, the mechanism connects the nodes via a wired communication medium, although other media are possible, and other types of coupling, including indirect connections are possible. The wired medium has the added advantage that it can be of a short physical length, which in combination with the tree topology means that a large assembly can still use data communication methods that rely on very modest voltage to both increase data rate and decrease unwanted electromagnetic interference. This is not a necessary part of the novel data transport method, however, it increases the utility of the method, since large physical assemblies of interconnected devices can be operated at favorable values of operational variables.

In an embodiment, the mechanism connects lighting devices, such as color tuneable LED luminaires. In an embodiment, the mechanism connects LED luminaires that can sense touch.

The method can be applied to any data network comprised of a plurality of nodes, wherein the nodes can be sensors and actuators, wherein the plurality of nodes can be comprised of functionally and structurally heterogeneous devices.

In another aspect, a network can in turn be a network of networks.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features, permutations, and combinations thereof concerning embodiments described herein are possible and contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
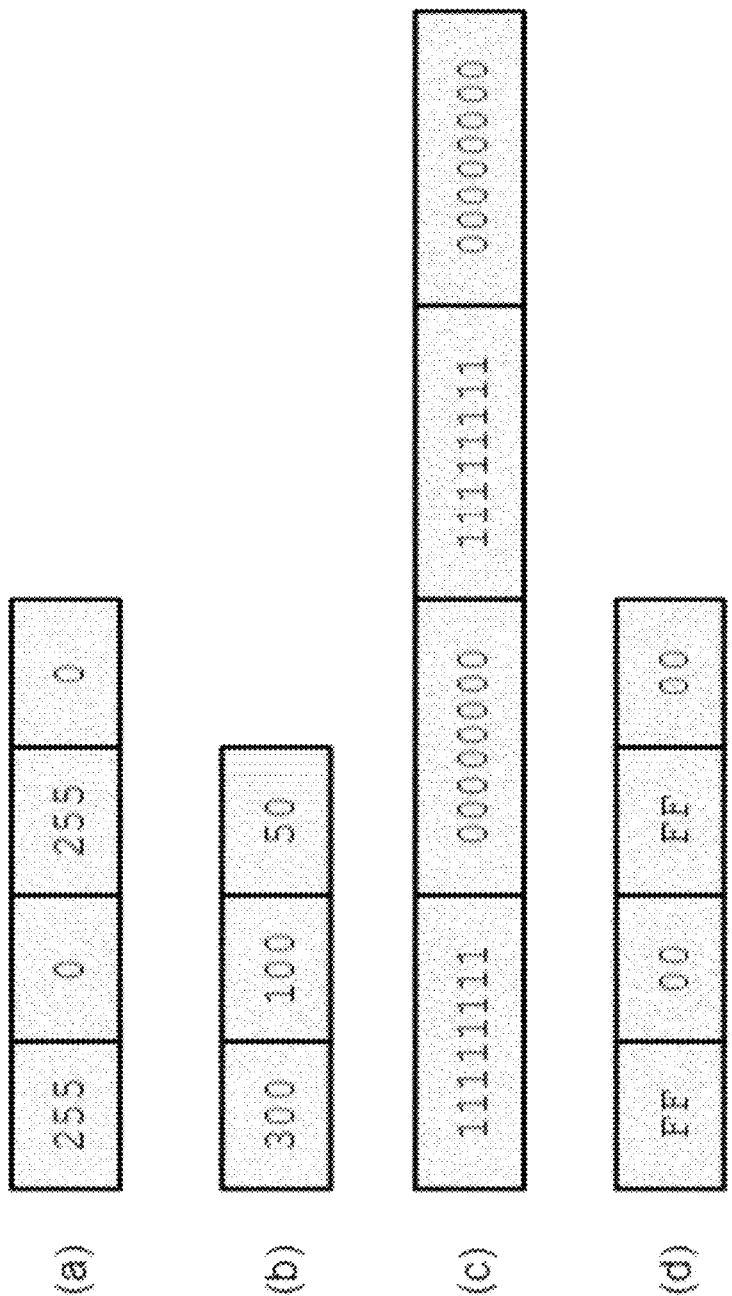
FIG. 1 is a data structure diagram illustrating example data arrays encoding optical outputs from an LED luminaire in different color space and number system representations, according to some embodiments.

Embodiments described herein are directed to technical problems in relation to communications across electronic data networks, especially where the communications are between components which do not have set addresses. Methods to transport data providing "address-less data transport" are described herein using various approaches to implementation using hardware, software, embedded firmware, circuitry, and/or combinations thereof. An order is introduced or associated with the nodes to establish relationships, and the order may be stored in the form of a tree topology in a data structure. The order of nodes is thus known, and logic and/or other data sets, data payloads, etc., may be transmitted across the nodes. The transmitting of the content provides for an improved data transport across a topology, for example, such as traversal across a tree topology of address-less nodes.

These are three non-limiting examples of data networks, which illustrate a number of design challenges in data networks. Central to addressing said challenges is the method by which data is packaged and transported through the network. These methods can be referred to as communication protocols, or protocols for short. Examples of existing protocols include but is not limited to Wi-Fi, Bluetooth™, Ethernet, Zigbee™. The protocols are specified as logical instructions with respect to how data are encoded and transported in the data network. Some protocols include additional specifications for how the data are presented to other networks or devices, or how connections to the Internet are handled. It is therefore possible a data network uses a plurality of protocols for disjoint sets of commands and tasks needed to communicate some data in a given network and to other networks. The logical instructions can be programmed in a software language, which once executed on a processing unit, such as a central processing units (CPU), microcontroller or generally an integrated circuit (IC), translates into a sequence of commands. The optimal manner in which a data network is installed, the protocols it uses and how the protocols are implemented and executed can vary greatly depending on the specific application the data network is part of.

Embodiments are described providing a method to create a communication protocol. Corresponding apparatuses, devices, processes, and computer-readable media are contemplated. A technological approach using configured hardware and software is described, providing a technological solution to provide improved electronic communications.

The protocol enables data communication at a high data rate between a possibly large plurality of heterogeneous devices. An example data network includes a communication medium that in part is not wireless, and is comprised of a plurality nodes connected to each other in a known or inferred abstract structure or topology, where at least one node is a network controller able to communicate data with the local network of nodes as well as other external networks. In some embodiments the data network is part of a modular assembly of light emitting diode (LED) lamps or luminaires, which can be actuated by data communicated in the network, where actuation means a different optical output is obtained from the LED lamp or luminaire. In some embodiments, the network is part of an installation of a smart home, smart office or smart retail space, where a plurality of sensors and actuators can be joined together and joined to at least one processing unit that can execute logical instructions involving the input from and output to a plurality of sensor or actuator part of the data network.

A number of illustrative embodiments are provided. Electrical, mechanical, logical and structural changes may be made to embodiments without departing from the spirit and scope of the embodiments.

Composition of Node and Its Control

One illustrative embodiment is a method to control a plurality of colored LED luminaires. The optical output of any given LED luminaire is a mixture of the optical output from a plurality of LED chips. In some embodiments, the LED chips emit predominately red, green and blue light, respectively. This can be called an RGB luminaire. In some embodiments the LED chips emit predominately red, green, blue and white light, respectively. This can be called an RGBW luminaire. In some embodiments the LED chips all emit white light, but of varying correlated color temperature (CCT). This can be called a tunable white luminaire. In some embodiments the LED chips all emit the same type of white light. This can be called a dimmable luminaire. LEDs are a composition of matter that acts as a semi-conductor.

The intensity by which each LED in any given LED luminaire emits light is a function of the integrated amount of electrical current that drives the LED. Any optical output for a given LED chip or any given plurality of LED chips connected in sequence therefore corresponds to an electrical current, assuming the operating conditions, such as but not limited to temperature and energy efficiency, are within the tolerances of the LED chip.

The optical output for one LED chip or a plurality of LED chips can be encoded as a data array, see FIG. 1. For a RGBW luminaire, four independent units of data can encode for the optical intensity or luminous flux each of the four individually controllable LED chip types should emit. The plurality of LED chips in a luminaire can be comprised of a plurality of each LED chip type. A possible construction can include three red LED chips, three green LED chips, three blue LED chips and four white LED chips. In this construction the first element in the data array can encode the optical intensity or luminous flux of the red LED chips acting in unison, the second element in the data array can encode the optical intensity or luminous flux of the green LED chips acting in unison, the third element in the data array can encode the optical intensity or luminous flux of the blue LED chips acting in unison, and the fourth element in the data array can encode the optical intensity or luminous flux of the white LED chips acting in unison. The elements in the data array for RGB, tunable white, dimmable, or other luminaires can follow the same or a similar convention.

In FIG. 1(a) an example of a data array for an RGBW luminaire is given. In this embodiment the integer 255 encodes for the maximum optical output that the corresponding plurality of LED chip types can generate within the operational tolerances of the luminaire, and in FIG. 1(a) that value is given to red and blue LED chip types. Zero encodes in this embodiment for no optical output, which is the integer given to green and white LED chip types. A value between zero and 255 encodes for an optical output between the two extremes. In this convention, the particular data array shown in FIG. 1(a) therefore encodes a magenta optical output, assuming the two distinct optical outputs from the LED chips are adequately mixed.

The type of color space representation used for an optical output can be different between embodiments. Color spaces, such as RGB, CMYK, HSL, HSV, CIE 1931, and CIEUV, can be used. FIG. 1(b) is an example of data for a certain optical output wherein the color is represented in the HSL color space. In this embodiment, the data array is mapped to a plurality of electrical currents, just as in the RGBW embodiment, however, a different mapping is used. Therefore as long as at least one of the color space representations can be translated into one or a plurality of drive currents, all color space representations can be translated into one or a plurality of drive currents.

The data in FIGS. 1(a) and 1(b) are represented in the base-10 number system. In some computer applications, or digital computing in general, the binary number system can be preferable. In FIG. 1(c) the equivalent data as in FIG. 1(a) is shown in the binary number representation. In some applications, the hexadecimal number system can be preferable. In FIG. 1(d) the equivalent data as in FIG. 1(a) is shown in the hexadecimal number representation. Other number representations can be contemplated. Since a transformation can be formulated between different color spaces and between different number representations, it is immaterial which representation of numbers and color space that is employed in the construction of the data array.

Figure 2:
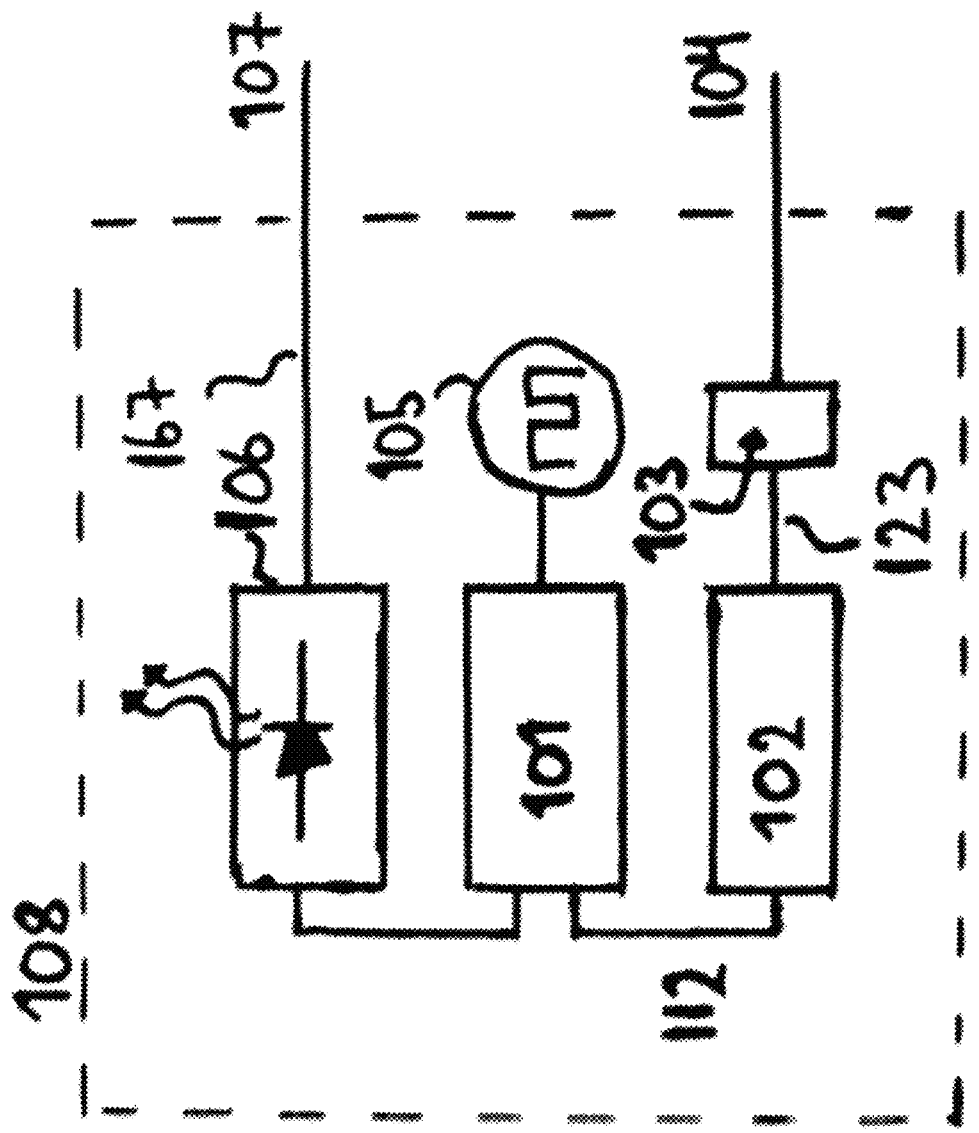
FIG. 2 is an illustration of an example of a single data network node, which can in some embodiments include light-emitting diodes, according to some embodiments.

Referring to FIG. 2, for each LED luminaire there can be an embedded microprocessor or digital processor 101. As used herein, these devices are meant to generally include digital processing devices, such as but not limited to, digital signal processors (DSPs), reduced instruction set computers (RISC), general-purpose (CISC) processors, microprocessors, gate arrays (e.g. FPGAs), PLDs, reconfigurable computer fabrics (RCFs), array processors, secure microprocessors, and application-specific integrated circuits (ASICs). Such digital processors may be contained on a single unitary IC die, or distributed across multiple components. It is the embedded microprocessor that interprets the data array in any encoding into electrical instructions, which alters the optical output of the LED luminaire accordingly.

For each LED luminaire there can be a volatile or non-volatile memory 102. As used herein, this includes IC or other storage device adapted for storing digital data, such as but not limited to, ROM, PROM, EEPROM, DRAM, SDRAM, DDR/2 SDRAM, EDO/FPMS, RLDRAM, SRAM, "flash" memory (e.g. NAND/NOR), and PSRAM. The memory can store the data array for optical output in any encoding, or other type of data arrays in any encoding, for a set duration, or for as long as the LED luminaire is electrically powered, or for as long as the particular section of memory is not overwritten with other data arrays. The memory is connected 112 to the microprocessor 101, such that data arrays can be transferred between the two components.

For each LED luminaire there can be one or a plurality of network interfaces 103. As used herein, this refers to any signal, data, or software interface with a component, network or process, such as but not limited to, Firewire (e.g. FW400, FW800), USB (e.g. USB2), Ethernet (e.g. 10/100, 10/100/1000, 10-Gig-E), MoCA, Serial ATA (e.g. SATA, e-SATA, SATAII), Ultra-ATA/DMA, Coaxsys (e.g. Tvnet), radio frequency tuner (e.g. in-band or OOB, cable modem), WiFi (802.11a,b,g,n), WiMAX (802.16), PAN (802.15) or IrDA families. The network interface or network interfaces receive data arrays from an external source 104 to the given LED luminaire. The network interface is connected 123 to the memory 102, to the microprocessor 101, or to both, such that received data arrays can be further processed, or such that created or stored data arrays can be sent to an external node through one or a plurality of network interfaces of the given LED luminaire.

For each LED luminaire there can be a clock or an internal clock 105. The clock is a component, which regulates the speed of any computing function, which can be measured as a clock rate in units of Hertz. Clock rates can be, but is not limited to, 1 kHz, 5 kHz, 2 MHz, 4.77 MHz, 100 MHz, 5.5 GHz. The clock can be integrated with the microprocessor 101. The clock can also enable the LED luminaire to keep track of duration of time, such that logical instructions like conditions with respect to how much time has passed between one executed command and an event can be programmed and executed on the microprocessor.

The LED luminaire can contain additional electronic components 106. These can be any electronic components that appropriately regulate voltage and current to the LED chips, such that a desirable lighting output is attained while also meeting requirements with respect to energy efficacy, electrical safety, electromagnetic interference, and other thresholds of best-practice electrical engineering. The exact composition or method by which the LEDs are electrically configured or controlled can vary. The other electronic components can embody other actuators and sensors, such that the LED luminaire is able to perform functions other than illumination. The exact composition of these secondary functions can vary, and their integration into the communication protocol are described in further detail below.

The LED luminaire or the network node can connect 167 to an external or internal power source 107, such that the various components can function. The power source can be direct current (DC) or alternate current (AC) from the electrical grid, a battery or an off-grid source of electrical power, such as a solar cell. In some embodiments, the connection to external power 107 is done over the same medium as the connection to an external data source 104.

The LED luminaire can contain a secondary optics to transform the light emitted from the LED chips before the light is emitted to the ambient environment for illumination. The exact composition of the secondary optics or method by which the optics operates can vary.

The LED luminaire or the network node can be enclosed by a material 108, which can provide mechanical support for the components, and protect them from perturbations, such as but not limited to physical damage, humidity, interfering radiation. The enclosing material can also serve to remove excess heat from the internal components to the ambient environment. The enclosing material can also be shaped such that it provides the LED luminaire with a functional or aesthetically favorable form. The material can be a plastic polymer, aluminium, steel, glass, wood or any other solid material or a combination thereof.

In some embodiments the invention relates to other components and functions than those of LED luminaires. The embodiment in FIG. 2 can with few if any modifications describe a sensor of an ambient temperature, where a microprocessor, memory, network interfaces, clock, additional electronic components, a power source and protective material with features as described above for the LED luminaire are used as well. The thermometer can be comprised of a thermistor, which relates a temperature to an electrical resistance by a known relation, which can be part of the secondary components 106. The value of the electrical resistance can through logical instructions executed on the microprocessor 101 be turned into a data array containing at least the temperature in units such as but not limited to Fahrenheit, Celsius, Kelvin, Rankine. The memory 102 enables the storage of the data array containing at least the temperature, or of other data arrays. The network interface or the plurality of network interfaces 103 enables the thermometer to communicate the data arrays to or from an external target or source 104. The data thus communicated can be embodied as a data array where one of the plurality of equivalent number systems as defined above can be used. This is an illustration that the construction in FIG. 2 can be applied to other sensors and actuators than LED luminaires, given that the secondary electrical components 106 can communicate data with the microprocessor.

There are additional examples of sensors that can generate data and communicate. Quantities that can be sensed include, but are not limited to, chemical concentrations of some compound or compounds, electrical fields, gravity, humidity, light intensity within some range of wave lengths, location within some frame of reference, magnetic fields, motion, orientation, pressure, shear stress, sound, temperature, tension or compression, torsion and vibration. Sensors that can be used to generate an analog or digital signal for these quantities include, but are not limited to, air flow meter, audio sensor, bolometer, electricity meter, gas meter, Global Positioning System (GPS) locator, infra-red sensor, microwave radiometer, accelerometer, gyroscope or other motion detector, potentiometer, pressure sensor, proximity or touch sensors based on capacitive sensing, still or video camera, thermometer.

References are made to nodes or network nodes in general that are part of the data network. This should be understood as being any actuator or sensor able to communicate data or data arrays by the logical instructions described in various embodiments. For the sake of clarity, many descriptions relate to LED luminaires, but embodiments are not limited to the specific application of LED luminaires, and rather, can apply to interconnected electrical components, such as modular electronics.

Plurality of Connected Nodes and Instruction Creation

In some embodiments a plurality of LED luminaires or network nodes as described above, are connected to each other by a network interface. One or more of the interconnected LED luminaires or network nodes in general are also connected to a controller. The controller can be a device that contains microprocessors, memory, network interfaces, where at least one network interface is compatible with at least one network interface of at least one LED luminaire or network node in general. Once connected to the LED luminaire or network node, the controller can communicate data arrays with the LED luminaire or network node through the network interface. The controller can in some embodiments be integrated with one or several of the LED luminaires or other network nodes. That means the material that encloses the components of the controller may fully or in part also enclose the components of an LED luminaire or other network node. This construction has the advantage that to an observer the controller is not a separate physical unit, rather the assembly can be comprised of physical units that are visually appreciably identical. In the embodiments described, the controller is therefore a unit that serves a particular role in the communication of data, and control in general of the network of network nodes, and the controller can be manifested as a separate component from all other network nodes, or it can be manifested as integrated within one or a plurality of other network nodes.

In embodiments where a plurality of LED luminaires or network nodes are interconnected by a plurality of network interfaces, a data array originating from the controller can reach a network interface of any LED luminaire or network node part of the network. This operation can require a LED luminaire or network node to execute logical instructions to route or otherwise contribute to the transport of the data array, such that it first receives a data array through one network interface, and second transmits the same or an altered data array through the same or a distinct network interface. Details of how this can be accomplished are described further below.

In a network of nodes, wherein the nodes perform some function that requires power, such as but not limited to create light from one or a plurality of LED chips, the electrical power can be received over a conductive medium from a neighboring network node. At least one of the network nodes in these embodiments connects to an external power source. As described above, this can include, but is not limited to, the electrical grid, which typically provides AC at a set voltage, an off-grid source, such as a solar panel, or a battery.

In some embodiments the network of nodes is connected to more than one external power source. This can be an advantageous embodiment in cases where a very large number of nodes are joined, and only one external power source thus implies a relatively large amount of current must be transported throughout the entire network. Operation of the network can be preceded by the grouping of node, such that nodes of a given group, and only nodes of that group, are powered by one of the many power sources. Each node in a group must be connected through a conductive medium to said power source, or connected through a conductive medium to at least one other node in the group, and the group is comprised of at least one node of the former property. The method to assign nodes to groups can be contemplated to be similar to the data communication methods that are described below. The exact method in which the nodes are powered can be independent of the method of communicating data in the network. Hence, in all embodiments of the invention, the nodes can be assumed to have access to electrical power.

The controller can execute logical instructions that involve both transmitting and receiving data from an external device, other than the LED luminaires or network nodes described above. External devices include, but are not limited to, a desktop computer, laptop, smartphone, router, wearable step-tracker, heart monitor, video camera, motion sensor, door bell, microphone, or a remote Internet-connected processor or computer, wherein the latter can execute logical instructions related to applications such as but not limited to social media profiles, online weather services, real-time prices on a stock-market or commodity market, electronic mail or messaging services. The communication medium can be wired, such as but not limited to Ethernet or power-line communication (PLC) or wireless, such as but not limited to Wi-Fi, Bluetooth™ and Zigbee™. A device that connects two otherwise disjoint networks, or that connects and appropriately translates data arrays between two otherwise disjoint networks, can be called a gateway.

The controller can contain a rule engine, which associates certain input with certain output. The input can be a data array or a plurality of data arrays, which originates from a source external to the controller and the LED luminaires or nodes, or it can originate from within the plurality of LED luminaires or nodes. The output the rule engine generates can be sent to a source external to the controller through one network interface, or it can be sent to the plurality of LED luminaires or network nodes through the one or another network interface. The execution of the rule engine on the controller, which can be a gateway between one and another distinct networks, can therefore associate an input from the one data network with an output to be sent to the one data network, or it can associate an input from the one data network with an output to be sent to the other data network, or it can associate an input from the other data network with an output to be sent to the one data network.

The rule engine can be adaptive to secondary input and therefore change such that a given input from the one or the other network is associated with another output than at a previous instance of the rule engine. The adaptation can be such that the rule engine exactly or approximately meets an objective. The objective can be encoded in an objective function, which creates a fitness value of how well the rule engine is able to meet the objective. The objective function can in turn be used together with a meta-rule engine in order to adjust the internal parameters of the rule engine in order to increase the likelihood of a better fitness value.

The rule engine and the meta-rule engine can be implemented as logical instructions stored in a digital memory and executed by the microprocessor of the controller. The rule engine can be implemented with methods, such as but not limited to decision trees, support-vector machines, linear discriminants, neural networks, convolutional neural networks, naive Bayesian classifiers, linear regression, logistic regression, or various ensemble methods, such as but not limited to random forests, gradient boosting of decision trees, bagging of decision trees. The meta-rule engine can be implemented with the same methods, or optimization methods, such as but not limited to zeroth-order optimization methods like genetic algorithms, random-walks, Metropolis-Hastings Monte Carlo methods, simulated annealing, or higher-order optimization methods like gradient descent, quasi-Newton, Levenberg-Marquardt methods.

Some or all parts of the logical instructions of the rule engine and the meta-rule engine can be stored and executed external to the controller and the LED luminaires or network nodes in general. The execution can take place on a separate computer, smartphone or computing device, which receives input from the controller through a network interface, evaluates the output according to the rule engine, and transmits the output through a network interface to the controller. In these cases the controller can include additional logical instructions to ensure the input it receives are authentic and not generated by an external source that should not have access to the controller.

A rule engine that is executed external to the controller and the LED luminaires or network nodes in general has the advantage that it can control a plurality of otherwise separate data networks. This design enables a construction of the controller with fewer components or smaller components or cheaper components, which can increase the utility of the particular embodiment. This design is however vulnerable in case the network interface to the external computing device is temporarily or permanently disabled. The communication with the external computing device can also increase the duration between transmission of data arrays and their processing to generate an output. The optimal embodiment of the controller and the rule engine can therefore depend on use-case, and a cost- and risk analysis for the intended application. With respect to the present innovation, however, the exact location relative the LED luminaires or network nodes in general, where a rule engine is evaluated is immaterial, and any of the variations enumerated above can be contemplated. Therefore, any description of the controller and commands executed on the controller, can refer to one or a plurality of local or remote devices relative the plurality of LED luminaires or network nodes in general, or some combination where some devices are local and some are remote.

The rule engine can be instructed to create the data arrays for optical output of LED luminaires, see FIG. 1, at any given instance in time. In embodiments that include a plurality of LED luminaires, a plurality of data arrays are thus created, which are intended to instruct all, specific subsets, or individual LED luminaires part of the plurality, which optical output to generate. The plurality of data arrays can be generated by another source, such as the manual creation of the data arrays through a user interface, such as command-line, a touch screen or by voice instructions. With respect to the present invention the method by which the plurality of data arrays are created, and how the plurality arrived at the controller is immaterial, and any of the above methods or other ones can be used.

The method to be described in detail below therefore relates to how a given plurality of data arrays, received by, stored in or generated by the controller, are transported from the controller to the LED luminaires or network nodes in general. The method to be described also relates to how a given plurality of data arrays, stored or generated by the plurality of LED luminaires or network nodes in general, are transported to the controller. The logical instructions the LED luminaires execute in order to translate a given data array into optical output, or the network nodes in general execute in order to translate a given data array into an altered state, can be as described above, or by any other method. The networking and transport protocol can be independent of how the data arrays are generated as well as how they are interpreted by the logical instructions of a given type of network nodes. This is an example of the layering design principle that is frequently considered when dealing with public and proprietary communication protocols.

Figure 3:
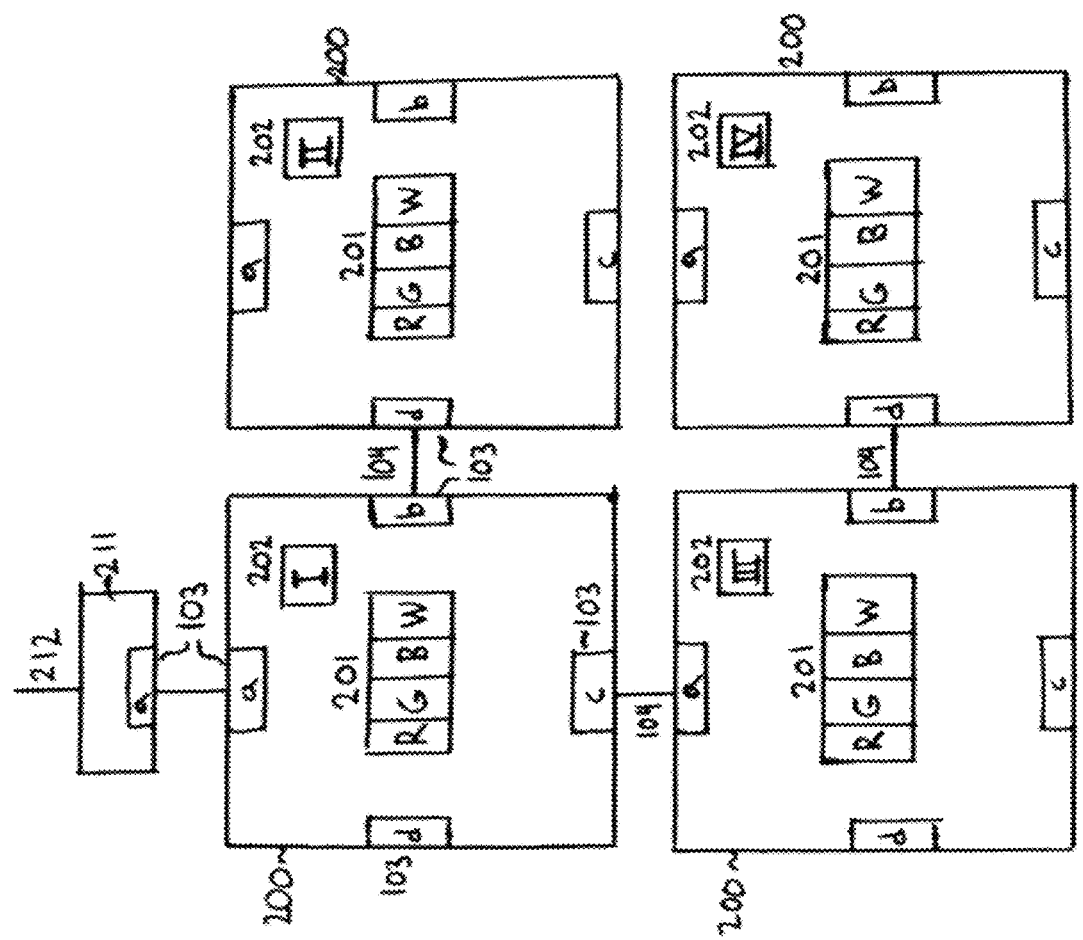
FIG. 3 is an illustration of a data network comprised of four LED luminaires and one controller joined in a tree topology, where each LED luminaire has four network interfaces and can emit a set amount of red, green, blue and white light, according to some embodiments.

Referring to the illustrative embodiment of an LED assembly in FIG. 3, there are four interconnected LED luminaires 200 of the same type, wherein the plurality is joined to a controller 211. Each LED luminaire can be independently set with respect to the luminous flux from red, green, blue and white LED chip types, wherein these fluxes are encoded as a data array 201. The data arrays can therefore be different between the LED luminaires at any time.

Each LED luminaire in the illustrative embodiment of FIG. 3 has four distinct network interfaces 103, which can connect 104 to either another LED luminaire, a controller, or be left unoccupied. The network interfaces 103 are within a given LED luminaire uniquely identifiable, in the particular embodiment by the identifiers a, b, c, and d. Other embodiments are possible to make network interfaces within a given LED luminaire identifiable. In some embodiments each LED luminaire 200 that is part of the interconnected assembly is uniquely associated with an identifier 202, in the particular embodiments by the Roman numerals I, II, III, and IV. Different means are also possible to make LED luminaires identifiable. The identifiers for either the LED luminaires or the network interfaces can be static over the lifetime of the product, or they can change over the lifetime of the product by some method. The first order as provided herein in various embodiments refers to the order of the network interfaces on any node. feature. One lexicographic order is provided, a>b>c>d, as that is what is true in the specific example in FIG. 3. However, other orders can be contemplated, including those established through clockwise and counter-clockwise traversal, since that overlaps with the lexicographic order in the specific example, in various embodiments.

The first order can be considered a first ordinal relation" which is the order that the network interfaces of any given node are in. That means, the first order makes statements like: "select the first network interface" or "select the next network interface" unambiguous and for any specific data network installation persistent. As noted below, a second order can be established based on the first order (in relation, for example, to FIG. 6).

The means of connecting 104 LED luminaires can be a short wire or rigid connector that enable communication of data arrays. Examples of such methods are enumerated in a paragraph above. In the case of wire or rigid connector, the manner in which the LED luminaires are connected reflects their relative spatial arrangement in the space they are installed. The means of connection can also be by long and flexible wire or through wireless means. Examples of such methods are enumerated in a paragraph above. In these cases the connections 104 in FIG. 3 does not have to reflect the relative spatial arrangement of the LED luminaires in the space they are installed.

Data Network and Topology

The connections 104 in FIG. 3 can be understood, regardless of their physical manifestation or the physical properties of the communication medium, as an abstract representation of available pathways for data arrays to transfer between LED luminaires or between LED luminaires and the controller through their respective network interfaces. In this abstract understanding the plurality of LED luminaires, or network nodes in general, and the plurality of connections comprises a data network.

The qualitative geometrical aspects of the plurality of node-to-node connections in a data network, which are invariant under certain continuous transformations, are referred to as the network topology or topology for short. The topology of the illustrative data network in FIG. 3 is fully defined by the exhaustive enumeration of connections 104 between network interfaces 103: LED luminaire I is connected to the controller, and to LED luminaires II and III, and LED luminaire III is connected to LED luminaire IV. The network topology can be represented as a mathematical graph. The network topology representation can be embodied in a data array, which is further discussed below.

Several classes of network topologies have been described in the literature on graph theory. These include:
  1. Line topology. Each node in the network is connected to two other nodes, except two nodes that are connected to only one other node. This can be visualized as a line where a data array to be transported from one node to another node has only one shortest path, which can involve intermediate nodes. In the case where there is only two nodes in the network, the particular line topology can be called a point-to-point topology.
  2. Ring topology. Each node in the network is connected to two other nodes. This topology implies the nodes are connected in a ring pattern, such that a data array to be transported from any one node to any other node has two possible paths, clockwise or counter-clockwise, both of which can involve intermediate nodes.

3. Bus topology. Each node is connected to a common network backbone, which is a communication medium through which data arrays are transported. This topology differs from the previous two in that data arrays can be sent between any two nodes without involving other nodes. Since all transfers of data arrays are done through the network backbone, contention for this resource can happen if multiple data arrays are sent concurrently.
4. Star topology. Each node is connected to only one other node, except one node which is connected to all other nodes. This topology implies there is one central node through which all data packages must be transported, while all other nodes are not required to aid with the data array transport. In typical embodiments, the central node is a network controller.
5. Tree topology. The nodes are connected in a hierarchy, where at each level of the hierarchy a given node connects to one node above itself in the hierarchy, and connects to zero, one or more nodes below itself in the hierarchy, and connects to zero nodes at the same level in the hierarchy. The tree hierarchy therefore contains a root node, which can be a controller. A data package to be transported to/from a node closer to the root (including the root itself), from/to a node farther removed from the root, has only one shortest path. It can be proven that a tree topology contains one node-to-node connection less than the number of nodes of the network. In the special case of the tree topology where each level only contains one node, a line topology is obtained. In the special case of the tree topology where there is only one level below the root node, a star topology is obtained.
6. Fully connected topology. Each node is connected to all other nodes. Transporting a data package from one node to any other node is conceptually simple, since there is guaranteed to be one direct connection, and no other nodes are required to act as intermediates.
7. Mesh topology. Each node can be connected to one, all or an intermediate number of other nodes in the network. This is the least constrained topology. Networks of this topology can contain some nodes that are more connected than other nodes, but not connected to all nodes, and therefore data arrays can be transported between nodes involving a plurality of other nodes. There can be multiple paths for transport, including loops wherein a data array can return to its source. The few constraints imply that there are numerous special cases, and thus more complex logical instructions than most other network topologies are required in order to handle the transport of data arrays.
8. Hybrid topology. This topology is a combination of other topologies, such that the network can be completely divided into interconnected sub-networks, wherein each sub-network has a topology of one of the above classes, but not necessarily the same class.

The network in FIG. 3 is therefore a tree topology, where the controller is the root node, and the other nodes are ordered in three levels below the root node. LED luminaire with identifier I is at one level higher in the hierarchy than LED luminaires with identifiers II and III. LED luminaire with identifier IV is in turn lower in the hierarchy than all other LED luminaires, and it only connects to one LED luminaire above itself, that is LED luminaire with identifier III.

As a data network is constructed by the joining of a plurality of devices, the properties of the data network topologies can be advantageous to applications with certain desired performances with respect to operational variables, such as but not limited to speed of data transfer, power consumption, ease of installation, and they can be disadvantageous to applications with certain desired performances with respect to operational variables, such as but not limited to speed of data transfer, power consumption, ease of installation. The tree topology can be used to connect a plurality of devices through a plurality of node-to-node connections, wherein each connection is of relatively short physical length, but wherein the plurality of devices once joined comprises an assembly of much larger physical dimensions.

The advantage that connections of relatively short physical lengths provides is that signal losses or perturbations due to resistance or other processes are reduced. One device or node in the plurality can therefore transmit a signal over the given medium to a neighboring device or node, where a relatively small difference in the physical signal denotes a particular symbol in a given data encoding. In some embodiments the difference between two symbols is encoded as the difference of voltage of the signal. The short physical length of the connection can therefore enable a relatively small difference between the two voltages, or in other words, the voltage swing can be relatively small. This can in turn enable a higher rate of data transmitted throughout the data network. Another benefit of small voltage swing and short physical length of the connection is that unwanted electromagnetic interference can be more readily reduced without the use of complicated material or electrical engineering. Unwanted electromagnetic interference is regulated in jurisdictions around the world.

These features imply that a physically large assembly of a plurality of devices can be constructed by joining the devices through physically short connections in a nested tree topology. Hence, the favorable operational variables as described above are attained, despite the large size of the assembly as a whole. A method to efficiently handle data transport throughout a data network of the tree topology is therefore useful and can enable many applications relevant to industry.

Primary Methods of Data Transport

One method of transporting a data array is by a network broadcast. A network broadcast is defined as the controller sending the identical data array to every other node in the network. The logical instructions to execute a broadcast in the data network of the illustrative embodiment in FIG. 3 are as follows.

First, the data array is transferred from the controller 211 via its network interface 103. The LED luminaire with identifier I is programmed to monitor activity on each of its network interfaces with a set frequency. The process can be referred to as polling and is controlled by logical instructions executed by the microprocessor. As a data array is discovered at its network interface a, the entire data array is retrieved and put into memory. The node proceeds to transfer the data array to each of the network interfaces from which the data array was not obtained through, in this case b, c, and d. The other LED luminaires are programmed identically to the first LED luminaire, therefore they too will after a set waiting period retrieve the data array through one of their respective network interfaces, and proceed to transfer it through each of their other network interfaces. These steps continue recursively until all nodes of the data network have received the data array. Because the network is of a tree topology, any given node in the network can only receive the data package one way. Any other node connected to a network interface other than the network interface from which the data array is received by a given node are as a consequence of the tree topology properties strictly lower in the tree hierarchy than the given node. In the described steps each LED luminaire is able to receive and forward a data array.

In some embodiments, the network interface is able to issue a network interrupt request to the microprocessor if it receives a data array. The request instructs the microprocessor to seize ongoing activities of a lower priority and to initiate the execution of a routine of logical instructions. The interrupt method can have the advantage over the polling method that the microprocessor only engages with the network interface when there is a data array present. The interrupt method can have the disadvantage that additional logical instructions must be available on the microprocessor and possibly the network interface in order to correctly handle the interrupt without corrupting other ongoing processes. As far as the ability to receive and forward data arrays by the LED luminaire, either the network interrupt method or the polling method can be used.

In order to send a data array to one specific LED luminaire in the network with instructions to, for example, adjust its red, green, blue and white optical output, another set of logical instructions can be executed. The method should work for any tree topology, hence it can not be assumed that the controller, which generates the data array, is in direct contact with the specific node. For illustrative purposes, the instruction to be sent is for LED luminaire with identifier III in FIG. 3 to set red, green, blue and white optical output to their maximum 255. The logical instructions can be as follow.

Figure 4:
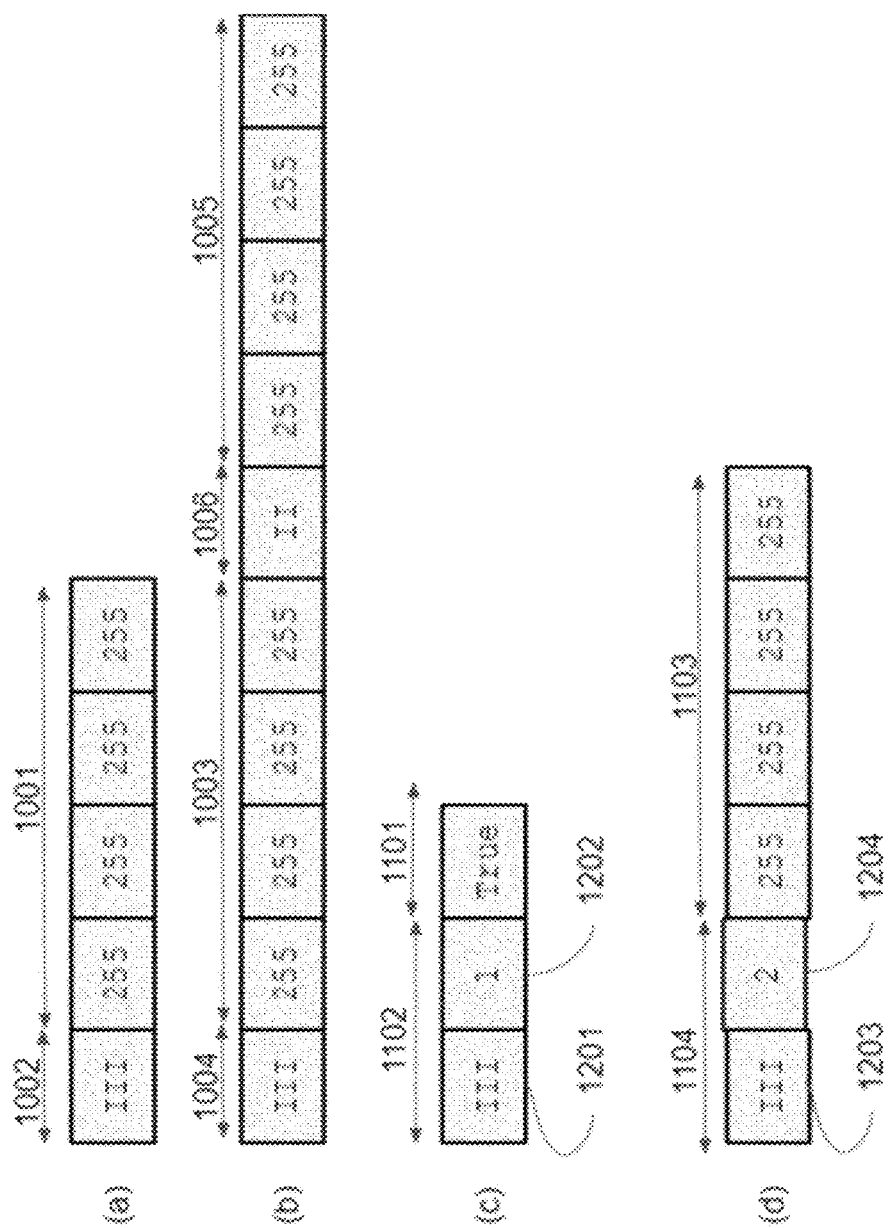
FIG. 4 is a data structure diagram illustrating example data arrays, including header and payload, that enables logical instructions to efficiently transport data in a data network, according to some embodiments.

First the controller creates a data array as shown in FIG. 4(*a*). It is comprised of a payload 1001 and a header 1002. The payload 1001 and the header 1002 are data arrays encoded in some number system, such as but not limited to the binary, hexadecimal, or 10-base number system. The payload 1001 is in the illustrative embodiment a data array similar or identical to the data arrays in FIG. 1, and has the same properties as described above. It is the data array of the payload, which once received by the intended LED luminaire generates the instructions for the optical output, as described above. The purpose of the data array in the header can be, in part or fully, to enable a correct transport, as described next.

Second, the data array of FIG. 4(*a*) is broadcast through the network, by a sequence of logical instructions described above. Third, in addition to the logical instructions executed by the microprocessor of each LED luminaire for the broadcast, logical instructions are executed wherein the data array in the header is compared against the data array that encodes the identifier of the given LED luminaire. If the two data arrays in the comparison are not equal, no other instructions in addition to the ones needed for the broadcast are executed. If the two data arrays in the comparison are equal, a distinct logical instruction set is executed, which at least can contain the steps that retrieve the payload data array, and input it into the logical routines that proceed to set the optical output of the LED luminaire accordingly. In the described steps each LED luminaire is able to receive, forward, and consume a given data array.

In order to instruct two of the LED luminaires in the illustrative embodiment of FIG. 3 to change optical output, one set of logical instructions is to execute in sequence two of the above commands. Another option, is for the controller to append the second data array, payload 1005 and header 1006, to the first data array, payload 1003 and header 1004, and broadcast as a single but larger data array, see FIG. 4(*b*). The logical instructions to execute for this case can be as follows.

First, the controller creates the data array in FIG. 4(*b*). Second, the data array is broadcast as described above. Third, the microprocessor of each LED luminaire or network node executes the comparison of the data array in the first header 1004 with the data array containing the given node identifier. If there is a match, the component of the data array following the first header, which is of a known size and that contains the relevant payload 1003 is retrieved and used to set the optical output. If there is no match, the second header 1006 is compared with the data array containing the given node identifier. If there is a match the component of the data array following the second header, which is of a known size and that contains the relevant payload 1005 is retrieved and used to set the optical output.

In order to reduce the required number of instructions to be executed on the microprocessors of the data network, the following modification can be done to the third step of the above method. For a given LED luminaire or network node, if there is a match in the comparison of the data array in the first or second header with the node identifier, the associated payload is retrieved as described above. However, in addition the data array is edited, such that the matching header and its associated payload are removed from the data array that is forwarded to the other network interfaces. If the data package after the described removal is empty, nothing is sent to the network interfaces. The consequence of this addition of logical instructions is that there is a non-zero likelihood that fewer logical instructions have to be executed as a data array is sent to the data network. For example, the LED luminaire with identifier IV will not execute a comparison that involves the data array of the header 1004 that contains the identifier III, since that part of the original data array from the controller would be removed by the LED luminaire above in the tree topology. In the described steps each LED luminaire is able to receive, forward, consume, and edit a given data array.

The methods so far have been described such that the entire data array is stored in memory as it is received through a network interface. Only after the entire data array has been obtained are the logical instructions executed, such as but not limited to the comparison of data arrays in the header, instructions to adjust the optical output of the LED chips, and the forwarding of the data array to the other network interfaces. All of the network and transport methods can be modified to instead begin transmitting bits of the data array before it is fully received. This can be called cut-through switching. An illustrative embodiment of the steps involved is as follows.

First, the network interface of a given node begins to receive individual elements or bits of the incoming data array. Second, once the first header has been fully received, the microprocessor executes the comparison of the data array in the first header with the node identifier. Third, if there is a match, the data array payload is stored in memory and subsequently used to set the optical output. The remainder of the incoming data array, if any, can be directly switched to the other network interfaces, since the relevant data package payload has already been consumed. In this embodiment the microprocessor can also be programmed to remove the part of the received data array containing the already consumed data package payload. If there is no match, the logical instructions are such that the data array is switched to be forwarded to the other network interfaces, until the next header is received, and the comparison is done again.

Other variants of cut-through switching can be contemplated, wherein the switching to send the data array to the other network interfaces begins directly after receiving it. The data array can be transported even faster through the network. Another variant can receive and store the first part of the data array, that is both header and payload, compare and if appropriate consume these parts of the entire data array, before forwarding anything. Other methods that instruct some partial processing of the incoming data array by logical commands executed on the microprocessor, followed by transmitting some data array to the other network interfaces, can be contemplated.

An advantage of cut-through switching can be reduced latency, especially for very long data arrays transported in very large data networks. In larger data networks receiving longer data packages with instructions for many nodes, the probability the particular data array elements or bits being processed at any given node are intended to be consumed by said node decreases. Therefore, reducing the number of logical instructions that are executed exclusively for the forwarding of data arrays is efficacious. Another advantage can be lowered requirements on how much available memory each node has. Components with large memory to store data arrays can be more expensive than components with less memory to store data arrays. Hence, reduced material costs can increase the utility of the product and data network.

In the above embodiments, the controller is sending instructions to the nodes, or the LED luminaires to change their optical output, defined as the data array for red, green, blue and white luminous flux or intensity. In some embodiments, the controller instead is instructed to ascertain the current optical output of one or a plurality of LED luminaires, in other words the controller needs to receive a data array from the data network. In illustrative embodiments, the data array that encodes the current optical output can be identical to the one in FIG. 4(b). It is the logical instructions on the controller that interprets the data array as information about current optical output rather than as an instruction to alter optical output.

The method to accomplish this task by the data network can be implemented in a number of different ways. Illustrative embodiments are given next.

In some embodiments, each node or LED luminaire is programmed to determine the value of its optical output with a set frequency, and store it as a data array of a certain color space and number system representation, such as in FIG. 1. The microprocessor retrieves the data array that encodes the node identifier from memory. The two data arrays are appended into one larger data array, such as shown in FIG. 4(a). The data array is subsequently forwarded to all network interfaces of the given node or LED luminaire. The tree topology implies that one of these network interfaces will connect to a node or LED luminaire higher up in the hierarchy, and hence closer to the controller.

As another node receives the data array thus generated through one of its network interfaces, the node processes it by one of the methods described above. That means, the node will at least forward the data array to its other network interfaces. Since the header is not going to match the identifier of any other node, the data array will not be consumed and can be forwarded as it was received. Since one of the network interfaces is guaranteed by the tree topology to connect to a node higher in the network hierarchy, and hence closer to the root, the data array is one level closer to the root. The forwarding process continues recursively until the data array is both received by the controller through its network interface, as well as once the data array reaches a terminal node in the network, that is one that only connects to a node higher in the hierarchy, in which case the data array is not forwarded any further. The memory and microprocessor of the controller can be instructed to process a received data package to in turn generate a new instruction to be sent either to the network of LED luminaires or nodes in general, or to an external target through another network interface of the controller.

In other embodiments, the controller initiates the creation of the data array at the node. The controller can generate a data array such as in FIG. 4(c). The data array is comprised of a header 1102 that includes the node identifier 1201, as in earlier embodiments. In addition, the header contains a section that can be understood as a message type identifier 1202. This identifier is a key to a dictionary that maps a given key value to an interpretation of the payload data array 1101. In FIG. 4(c), the message type identifier is 1, and in the dictionary, this integer maps to a logical instruction set that once executed interpret the payload 1101 as a command to either generate a data array of the current optical output, or to not generate a data array of such kind. The logical instructions can be as follows.

The network interface of a given node receives a data array. The header is split into two parts, and the part containing the data array with the node identifier 1201 is compared against the node identifier of the given node. If no match, the data array is forwarded by any method, such as the ones described above. Cut-through switching can be used. If there is a match, the part of the header that includes the data array with the message type identifier 1202 is compared against the keys of the dictionary. If the data array or value equals the data array or value that encodes for the reporting of the current optical output, the payload 1101 is retrieved and interpreted. In the embodiment in FIG. 4(c) the payload is a Boolean, but other representations of the instruction can be used. If the data array or value of the payload generates the appropriate comparison, the logical instructions described above are executed and a data array, such as the one in FIG. 4(a), is created and forwarded as described above.

In some embodiments the message type identifier is not associated with a payload as in FIG. 4(c). The logical instructions can be such that the presence of a given message type identifier in a received data array is associated with a certain logical instruction set. The absence of said message type identifier in a received data array is associated with not executing the same logical instruction set. The payload of FIG. 4(c) is in these logical instructions implicit, and an explicit encoding can be avoided.

In the described steps of the recent embodiments each LED luminaire or node in general is able to receive, forward, consume, edit, and create a data array.

In some embodiments, the data network can both report current optical output, or other state of the node, encoded as a data array in general, and instruct changes to the optical output, or other state of the node encoded as a data array in general. The combination of the embodiments can require that a message type identifier 1204 is assigned to the instruction to adjust optical output, see FIG. 4(d) for an example. The reason this was not required in the earlier embodiments was that there was only one meaning of the payload.

In some embodiments additional message type identifiers are used to enable additional associations of logical instruction sets and the payload data array. Data networks wherein the nodes can be actuated in other ways than adjusting their optical output is one example. Data networks wherein both optical output and sensed ambient temperature are handled and transported is another example. Other illustrative embodiments are described below, and the embodiments so far are meant to illustrate logical concepts of data array transport, not to provide an exhaustive enumeration of applications.

In a data network embodiment wherein nodes can create messages as well as receive, forward, consume and edit, additional logic instructions can be added to support acknowledgements. In data networks wherein the communication medium, the network interface or some other component or functionality, are not guaranteed to operate without fault every time, each node can be programmed to acknowledge that it updated its optical output, or other state, after it has received and consumed a payload for that purpose. The controller can in such embodiments be programmed to execute a set of logical instructions based on a condition with respect to if an acknowledgement was received within some time threshold. The time can be measured with the internal clock.

The data array a node creates in order to acknowledge that it has updated the data array that defines its state, such as the optical output, can be as in FIG. 4(c). The difference from before is that the message type indicator 1202 in the header 1102 should correspond to an acknowledgement in a dictionary available at least to the controller. The data array generated for acknowledgement can be as in FIG. 4(d). The difference from before is that the message type indicator 1204 in the header 1104 should correspond to an acknowledgement in a dictionary available at least to the controller. Other data arrays can be contemplated to define an acknowledgement.

The controller can upon failing to receive the appropriate acknowledgement data array within a specified time, recreate the original data array for instruction, or retrieve it from memory in case it is available, and forward it again through the appropriate network interface. The controller can continue to take this action until an acknowledgement is received, or until the number of attempts exceed a set value, whichever happens first.

In the case in which the data array is not correctly consumed due to that the communication medium is unreliable because of randomly fluctuating interference, or noise, repeated attempts increases the probability that at least one data array is received. Wireless connections can rely on radio, optical or audio signals to travel through the ambient space, and such signals can be perturbed, obliterated or otherwise modified by objects in the space or by other signals travelling through the same space. Wired connections, which can rely on electrical conduction or optical signals through fiber optics, are expected to be less perturbed. However noise can be caused by other conducting parts of the components of the data network or a separate device, which couples or interferes with the wire and thus introduces a degree of noise in the given communication medium. The increase of the signal amplitude is one method to overcome signal losses due to interfering noise. It is a method that above a threshold gives rise to electromagnetic radiation beyond the given device, which can affect performance of other nearby devices, including but not limited to audio distortions to sound from loudspeakers. Other sources of noise can be contemplated, but regardless of source, repeated transmission increases probability of the data array being received.

In case the controller does not receive an acknowledgement after repeated attempts, the controller can be programmed upon that condition to generate an error message to be sent through a separate network interface to alert a user or machine that a message failed to be delivered. The controller can be programmed upon that condition to update its internal data array representation of the data network, in effect assuming the failure to receive the acknowledgement is an indication that the network topology has changed.

Other applications of data networks wherein an acknowledgement is needed to select between logical instruction sets can be contemplated.

Some communication media can, in part, reflect the signal that encodes the data array. As described above, objects in a space in which a wireless signal is transmitted can modify the signal, such that it is reflected, and possibly with reduced amplitude. In wired communication media, reflections can take place at interfaces where there is an impedance mismatch. In embodiments where reflections are rare or with a high degree of probability of a much lower amplitude than the original signal, no additional logical instructions are required. In embodiments where this is not true, each node can execute logical instructions that ensures that a second data array identical to a first data array is discarded in case it is received within some threshold duration of the first data array. Alternatively, amplitude thresholds can be introduced that reduces the risk of accepting the identical data array twice due to imperfections in the communication medium. Other methods to handle this can be contemplated.

The embodiments so far has been described with data arrays containing at least a payload, in some cases a header, which in turn has been described to contain a node identifier or a message type identifier. With these components of the data array, a number of illustrative embodiments of methods to transport data and execute logical instructions have been described. In some embodiments, the header will contain additional data arrays, which can serve purposes other than the efficient transport of data in the network. Examples of other data arrays include, but is not limited to: a hop counter, which increments by some integer each instance a data package is forwarded; a checksum field, which is a value that can be used to determine if the data array was corrupted as it was transported; a version identifier, which is a value that enables a node to ensure the version of the logical instructions that generated the data array is compatible with the version of the logical instructions that are consuming or forwarding the data array; a header length specification, which is a value that specifies how long the data array that contains the header is; a message priority identifier, which ranks the priority of the payload, such that if there is contention for the network interfaces, the higher priority messages are processed before lower priority data arrays; a data source identifier, which specifies which node generated the data array; a security type identifier, which can be used if the payload is encrypted and the security type enables the node to decrypt the message with the appropriate method; unspecified data array, which can be parts of the header but may not contain any data to be interpreted, instead it is present to enable future or custom functionality to be implemented without altering the total size of the data array of the header. A header comprised of additional data arrays does not alter the salient aspects of the transport methods as described above. Hence, the illustrative embodiments should be understood to describe what the minimal data array can be in order to execute the transport, not as the complete specification of what the data array can contain.

Methods of Data Transport Based on Topology

The embodiments described so far have implicitly used the tree topology. As messages are received and forwarded, the data array is never forwarded through the network interface the data package was received. In a tree topology, this guarantees a data package only travels downwards or upwards, never both directions, in the node hierarchy. This relation furthermore implies that a data array can only be received at any given node through one path. The event wherein a node receives one data array forwarded by the controller at two distinct times through two distinct paths is eliminated as a consequence of the topology and the logical conventions as described. Therefore, no logical instructions are necessarily required at each node in order to determine if a received and possibly consumed data array already has been received and possibly consumed.

The tree topology can in some embodiments be explicitly used to make transport of data arrays in the network more efficient. These embodiments of the method require a representation of the network topology as a data array, which in some embodiments can be used by logical instructions executed on the controller, and in some embodiments can be used by logical instructions executed on the controller and on one or a plurality of network nodes. These embodiments of the method require a method to create said representation of the network topology as a data array. These two aspects are described in detail next.

A data array with ordered pairs of node identifiers can be used to embody a representation of the tree topology as a data array. The embodiment of a data network as shown in FIG. 3 generates in this convention a data array as shown in FIG. 5(a). The first identifier in the pair indicates the node higher in the tree, with the identifier C, for controller, at the top. In this representation, nodes II and IV are readily identified as terminal nodes without any connections to nodes lower in the hierarchy because identifiers II and IV only appear as the second identifier in the list of pairs.

Alternatively, a data array of node identifier and network interface identifiers associated to another node identifier, can be used. The embodiment of a data network as shown in FIG. 3 generates in this convention a data array as shown in FIG. 5(b). In addition to the previous representation, this representation includes information on the identity of the network interface that is forming any given node-to-node connection. Since network interfaces can be unoccupied, the data array has to be able to represent that, in FIG. 5(b) the empty-set symbol has been arbitrarily chosen.

In some embodiments an unoccupied network interface is not explicitly encoded in the data array, instead the corresponding pair in FIG. 5(b) is omitted. The logical instructions in these embodiments can be constructed such that upon execution the absence of a pairing, the relevant network interface is inferred to be unoccupied.

In some embodiments the network interface identifiers are not explicitly encoded in the data array, instead their order is a known constant in any logical instructions. For the data network in FIG. 3, the order of the network interfaces can be lexicographic, that is a precedes b, which precedes c, which precedes d. Other orderings can be contemplated. In this convention a data array as in FIG. 5(c) can be obtained.

Alternatively a data array of connections that only includes connections to nodes lower in the tree hierarchy can be used. The data array in FIG. 5(b) is for example redundantly representing that the node with identifier I is connected to node with identifier II. With the convention of listing only connection to lower nodes, this redundancy is removed. In this convention a data array as in FIG. 5(d) can be obtained.

Alternatively a data array of connections that only includes the number of nodes lower in the tree hierarchy and through which network interface they connect can be used. The data array in FIG. 5(e) is an example. It does not specify node identifiers, rather it represents the topological connections for the ordered network interfaces. A variation of the data array embodiment in FIG. 5(e) can discard the node identifier, and represents exclusively the topology of unspecified nodes and their node-to-node connections via the ordered network interfaces. The data array in FIG. 5(f) is an example.

In some embodiments the data array encodes the tree by a combination of the above conventions. Other embodiments of a tree representation in a data array can be contemplated wherein the plurality of node-to-node connections and their ordering as the ordered network interfaces are traversed. This includes but is not limited to methods in graph theory that employ adjacency matrices and adjacency lists as algebraic representations of graphs in general, trees in particular.

The complete data array that embodies the representation of the tree topology can be stored in memory of the controller. The complete data array can be stored in memory of the nodes in the data network, or in a subset thereof. The data array can also be stored in part in memory of the nodes in the data network. The data arrays in FIGS. 5(b), 5(c) and 5(e) are comprised of a plurality of data arrays, where each of these data arrays can be stored in memory of the relevant node for the given data array. In some embodiments, nodes only have access to a data array that represents only the connections to neighboring nodes. In the data network in FIG. 3, and the transport methods described so far, the node with identifier II is not involved in any transport of data arrays between nodes with identifiers I and III, or III and IV. Therefore, the data array stored at any given node can be a subset of the complete tree representation, and hence reduce the required memory needed and reduce the number of logical instructions that have to be executed for the transport of data.

Figure 5:
FIG. 5 is an illustration of data arrays that represent a data network topology, according to some embodiments.

The necessary property of any data array embodiment of the representation is that it enables logical instructions to infer the topology of the network, including how node-to-node connections are disposed over the ordered network interfaces. Some data array embodiments enable logical instructions to infer additional information about the data network. FIG. 5 shows illustrative data array embodiments and should not be understood as an exhaustive enumeration.

The method to construct a data array of the topology, such as but not limited to the embodiments described above, can be as follows. The controller generates a data array that is comprised of a message type identifier. The data array can contain additional data, such as but not limited to a Boolean. The message type identifier is mapped to a set of logical instructions. The set can be called the layout detect instructions. The message type identifier can be an integer in the binary number system, an integer in the 10-base number system, an ASCII character, a plurality of ASCII characters.

The controller broadcasts the data array it created to the data network by the broadcast method described above. As the first node in the data network receives the data array through one of its network interfaces, the message type identifier is interpreted and the layout detect logical instructions are executed. For illustrative purposes the data array with the message type identifier can be referred to as L. The layout detect logical instructions are first described with respect to the illustrative embodiment of FIG. 3, after that described generally.

The first node selects the first network interface in the ordered set of network interfaces, other than the network interface through which it received the data array L. The first node proceeds to forward the data array L through said network interface. Referring to FIG. 3, that is network interface b. The first node starts the internal clock.

The second node receives the data array L and executes the same logical instruction set as the first node, that is it attempts to forward the data array L through its first network interface. Referring to FIG. 3, that is network interface a. Since there is no node connected to that network interface, the logical instructions executed on the second node creates a second data array, which embodies the fact that the second node has no other node attached through its first network interface. For illustrative purposes the second data array can be referred to as D.

The logical instructions executed on the second node continues, and the data array L is forwarded through its second network interface. Referring to FIG. 3, that is network interface b. Again, since there is no node connected to that network interface, the logical instructions executed on the second node edits the data array D, such that the fact that the second node has no other node attached through its second network interface is embodied. The editing can be by appending one data array to another data array.

The logical instructions continue to be executed in this manner until the ordered set of network interfaces has been completely traversed. In the illustrative embodiment in FIG. 3, that means that the data array D the second node creates embodies the facts that the second node connects to no other node, in other words the second node is a terminal node in the tree topology. The logical instructions executed on the second node concludes by forwarding the data array D up in the tree hierarchy, that is through network interface d.

The first node receives the data array D from the second node, and the internal clock can be stopped. The logical instructions executed on the first node proceeds and, as was done for the second node, a new data array is created. This data array can be created such that it embodies the fact that there is only one other node lower in the tree hierarchy attached through the first network interface of the first node. This data array can be created such that it embodies the precise nature of the network interfaces of the second node. In either case the data array of the first node is created by joining the entire, parts of, or an aggregated version of, the received data array D to the data array of the first node.

The execution of logical instructions of the first node proceeds in a manner congruent with the executions of logical instructions of the second node in that the data array L is forwarded through the second network interface of the first node. Referring to FIG. 3, that is network interface c. Continuing to refer to FIG. 3, a third node receives the data array, which initiates the execution of logical instructions congruent with the execution of logical instructions of the two previous nodes. In short, that means the third node will both forward the data array L to the fourth node, as well as ascertain the unoccupied state of network interfaces c and d, and embody these facts in a data array D, which is forwarded back up the tree hierarchy, that is through network interface a, to the first node.

Figure 6:
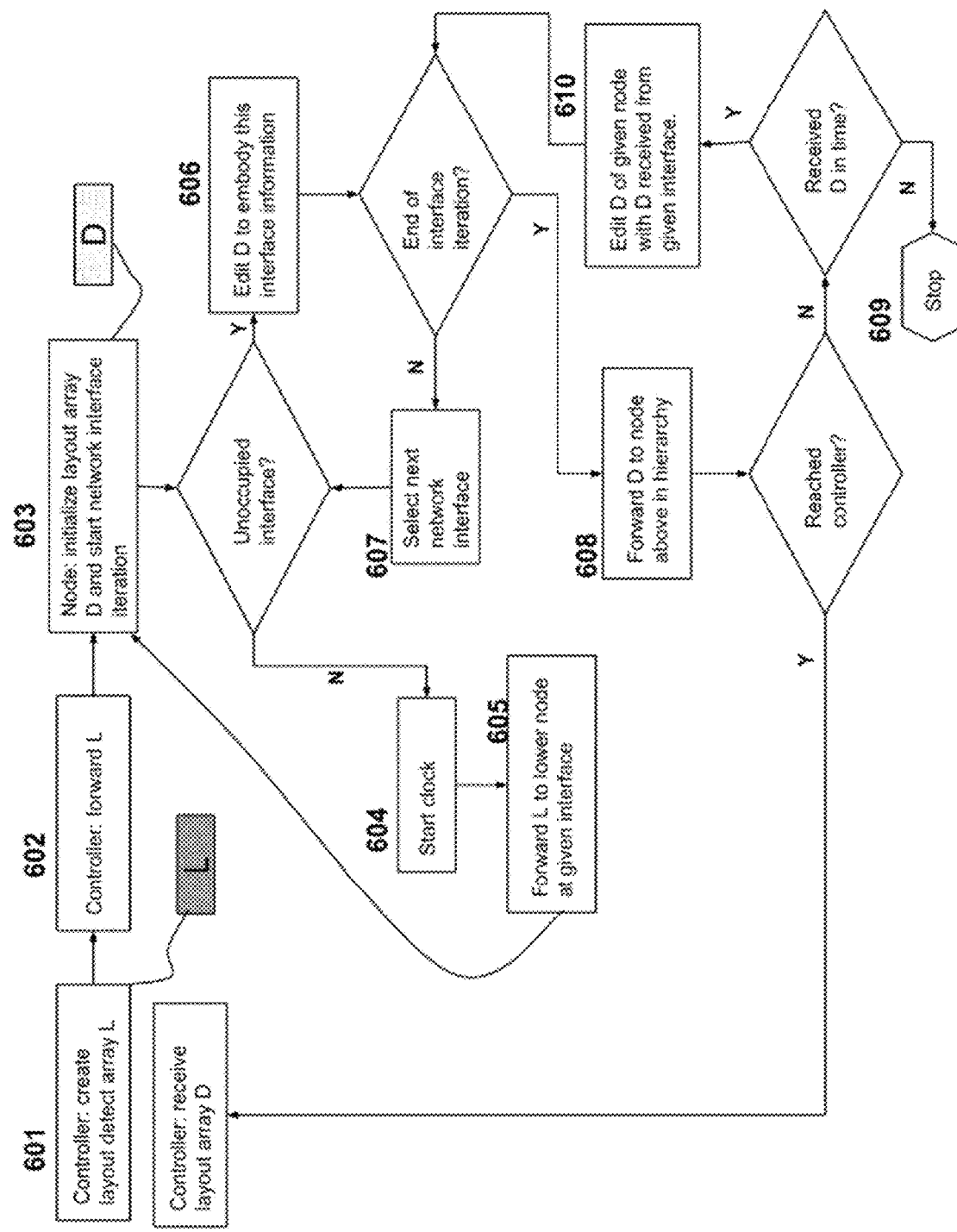
FIG. 6 is an example flow-chart of a method to detect layout, according to some embodiments.

Referring to the flow-chart in FIG. 6, the logical instructions for a general data network proceeds through recursion. The controller initiates the creation 601 of a data array L that is forwarded 602 to a first node. The data array L is received by a node in the network, and after it has been read, logical instructions 603 are executed in order to both initialize a new data array D, and to start an iteration over the ordered set of network interfaces of said node. In the event the given network interface at the particular step of the iteration connects to another node, the given node starts the internal clock 604 and forwards 605 the data array L through the given network interface. At this point the given node pauses further execution. Instead it is the other node that received data array L through step 605, which starts its execution of logical instructions. In other words step 603 is taken. Step 605 therefore implies a step further down in the recursion of the tree of interconnected nodes.

In the event the given network interface at the given step of the iteration over the ordered set of network interfaces of a given node is unoccupied, a different subset of logical instructions are executed. The data array D is edited such that the information about the given network interface being unoccupied is recorded 606. The logical instructions then determines if this was the final of the network interfaces that the iteration started in step 603 includes. If not, the iteration proceeds to the next network interface 607. One of the two subsets of logical instructions as above (that is 604 and 605, or 606) are selected depending on if the given network interface is unoccupied or not. If it is not unoccupied, another step down in the recursion of the tree of interconnected nodes follows.

In the event that for a given node the iteration over its ordered set of network interfaces has been exhausted, the data array D is forwarded through the one network interface of the given node that leads to a node higher up in the tree hierarchy 608. This is therefore a step up in the recursion of the tree of interconnected nodes. If the node that thus receives data array D is the controller, data array D contains the complete specification of the data network topology. Execution then ends. If the node that thus receives the data array D is not the controller, the internal clock of the given node, which was started as the recursion down was made 604, is stopped. In some embodiments, if the clock at any time exceeds a set limit, the execution stops with an error 609.

The node that received data array D from one of its network interfaces that leads to nodes lower in the tree hierarchy, edits 610 its own current version of the layout data array, such that the information contained in the received data array is included in some complete, partial or aggregated manner. An updated version of the data array D of the given node is thus obtained. The logical instructions then determines for the given node if this was the final of the network interfaces that the iteration started in step 603 includes. If not, the iteration proceeds to the next network interface 607 and already described logical instructions are executed.

The updated version of the data array includes an updated order, the second order, which is similarly an order of the nodes of any given data network in relation to the first order. As noted herein in various embodiments, the second order is established on basis of two other properties of the data network: the precise tree topology of the data network, as well as the first order for the nodes comprising the data network.

Figure 7:
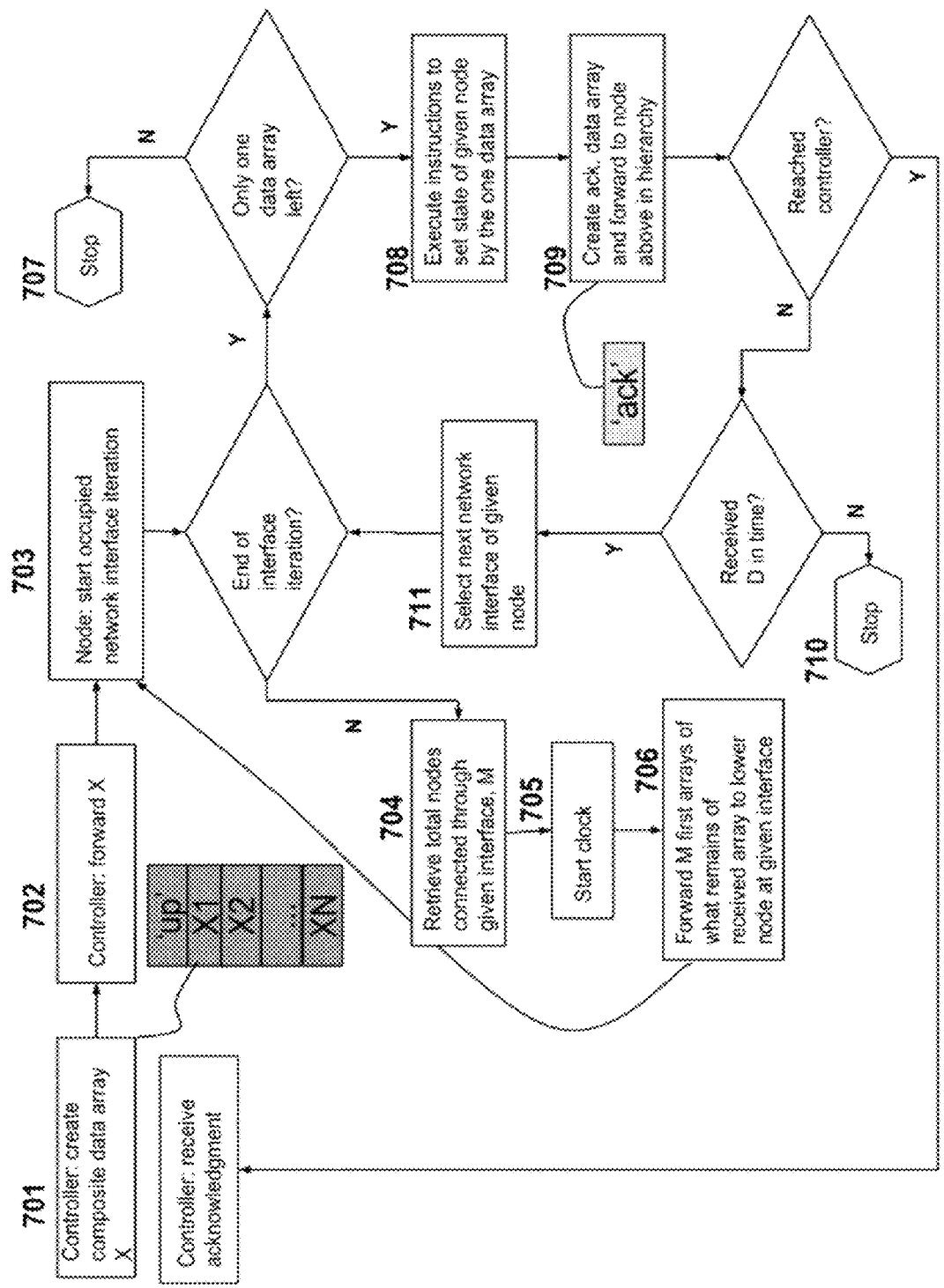
FIG. 7 is an example flow-chart of a method to perform bulk update, according to some embodiments.
Figure 8:
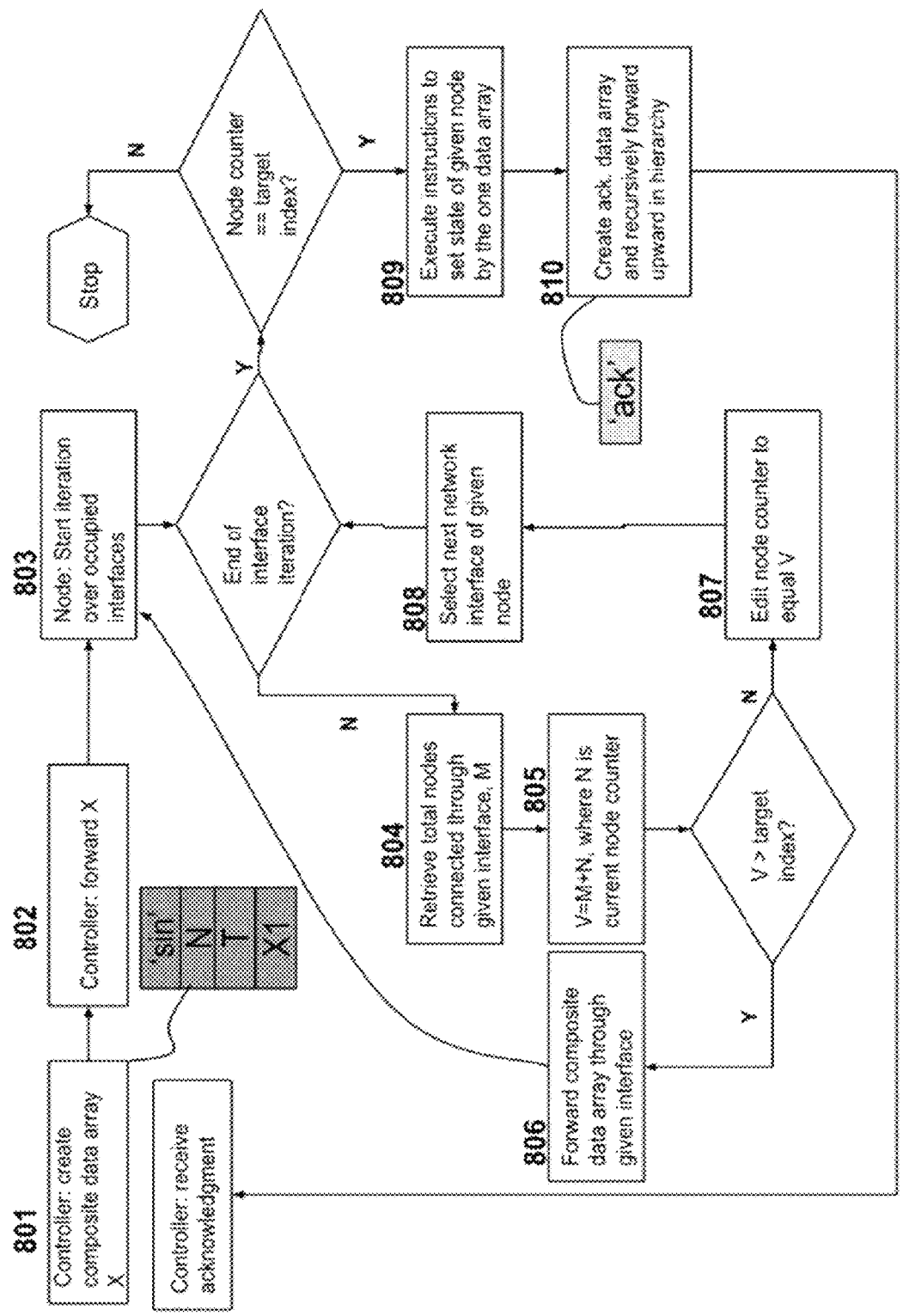
FIG. 8 is an example flow-chart of a method to perform single update, according to some embodiments.
Figure 9:
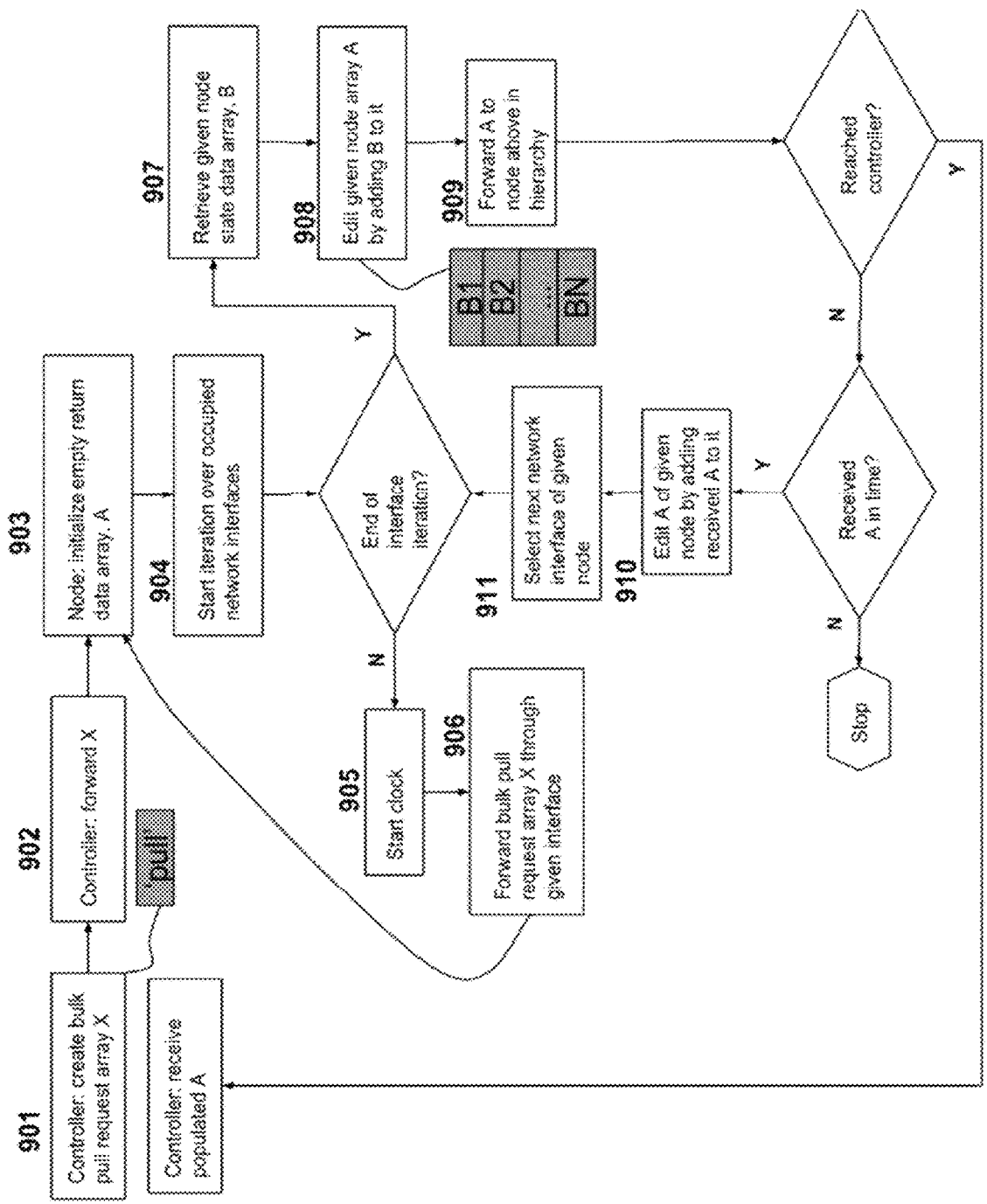
FIG. 9 is an example flow-chart of a method to perform bulk pull, according to some embodiments.

The transport of the composite data array according to various embodiments exploits the determined second order for efficient transport, as then described at length in the different methods illustrated in FIGS. 7, 8, and 9.

Because of the tree topology, these steps ascertains the properties of the network interfaces by traversing as deep as possible through a given branch until a terminal node is reached, and then the data array containing the information ascertained so far is forwarded back upwards the tree. The controller is guaranteed to receive a data array with a complete specification of the data network topology. The method described shares some features with the depth-first search algorithms that have been used for maze solving and other applications.

The layout detection method can be modified with respect to how the network interfaces are iterated over. As stated above, the method described so far leads to that the network is traversed as deep as possible through a first network interface before the part of the network that is connected through a second network interface is traversed. Some embodiments can instead execute logical instructions wherein the network is traversed only one layer deep at each iteration over the network interfaces, and only once the entire ordered set of network interfaces of a first node has been exhausted by the iteration, are iterations started over network interfaces of a second node connected to the first node. Because of the tree topology, these steps ascertain the properties of the network interfaces by traversing as wide as possible through the network interfaces of a given node until all interfaces have been characterized, and then the data array containing the information ascertained so far further added to by nodes below the given node in the tree hierarchy. The controller is guaranteed to receive a data array with a complete specification of the data network topology. The data array embodiment can be different from the data array embodiment obtained by the method described above, and illustrated in FIG. 6. However the two embodiments provide a complete and geometrically equivalent representation of the network. The method described has certain features in common with the breadth-first search algorithms that have been used for maze solving and other applications.

In some embodiments a combination of deep-first search and breadth-first search approaches can be used. A subset of nodes can use one approach, and another subset of nodes can use the other approach. The choice of approach can be encoded in a data array or integer and stored in memory. The approach used matters to how the layout data array is interpreted in logical instructions of the transport methods to be described below.

In the method for layout detection described above, and illustrated in FIG. 6, it is only one node that is executing logical instructions at any given time. A node that has forwarded the data array L to another node 605 will pause its execution while waiting to receive a data array D from the same network interface 608. In some embodiments a given node continues its execution of forwarding data array L to its other network interfaces, while nodes below it in the tree hierarchy are executing their logical instructions as otherwise described above. This embodiment can yield a quicker return of the layout data array to the controller. The execution of logical instructions are in these embodiments parallelized over the plurality of microprocessors in the data network rather than executed in sequence. Parallel processes creates other conditions to handle, such as how the plurality of events are synchronized as their respective output data arrays have to be joined. These embodiments of the logical instructions therefore can lead to additional complexity of the execution in order to handle events such as, but not limited to, receiving a data array from two or more network interfaces concurrently. There are methods to handle these types of conditions, which can be organized under the name concurrency control. Methods that adequately addresses the additional complexity of concurrent processes can be used in an embodiment.

In the method for layout detection described above, and illustrated in FIG. 6, the layout is only concerned with the topology of the plurality of nodes, where each node is otherwise treated the same. In some embodiments the data network can be comprised of nodes that are functionality distinct. In these embodiments a device type identifier can be retrieved as well during the execution of the layout detection. At step 603 in FIG. 6, the layout detection data array is initialized by the given node to subsequently be populated and once the upwards recursion 608 reaches the controller a fully populated data array is obtained. Part of the initialization can be to include a node type identifier in the data array. The node type identifier can be embodied as a data array stored in the memory of the corresponding device. The node type identifier is thus obtained by the controller, and its place in the network topology is fully defined. A rule engine or other sets of logical instructions can therefore include information on the types of nodes that are available, which in turn can be used to control the type of data arrays that are transmitted to these devices, by any method, including but not limited to the ones described below. In some embodiments multiple power sources are identified as nodes of distinct type in the data network. In some embodiments sensors are identified as nodes of distinct type in the data network. Other types of sensors or actuators part of the network can be represented with a data array similarly.

The method to construct a data array to represent the topology can be through manual input via a user interface. This can require a person upon installation to enter the data array through a command-line interface, or to build a visual representation on a touch screen of the installation, which then enables connections to be inferred from the visual representation. Other methods of manual input of the data array can be contemplated.

In embodiments wherein the controller has a data array representation stored in memory of the tree topology, such as but not limited to the ones described above and illustrated in FIG. 5, obtained by a method, such as but not limited to the ones described above and illustrated in FIG. 6, other methods of transporting a data array than what has been described above can be used. A feature of the tree representation is that all nodes are ordered relative some convention. The controller can for any node in the network infer where in the order said node is located based on the data array that describes the tree topology.

An illustrative embodiment that uses this feature for the network of LED luminaires in FIG. 3 is described next. The use-case relates to a bulk update of the optical output of all LED luminaires. As described above, that can be done by providing each LED luminaire with a data array with the desired luminous flux for each of the pluralities of LED chip types. The first step in the bulk updates is the creation of this plurality of data arrays by the controller. The specific values can be created by any of the methods described above, such as but not limited to an output of an external rule engine, or manual input through a user interface.

The second step is that the controller joins the plurality of data arrays together into one large composite data array. The order of the data arrays is a consequence of the tree topology, as described further below. To the beginning of the composite data array, a message type identifier is added, which in a dictionary maps to a specific set of logical instructions to be executed on the nodes. The set of instructions can be called bulk update. The controller proceeds to forward the composite data array.

The first node that receives the data array interprets the message type identifier and starts the execution of the associated set of logical instructions. The first step in these logical instructions is for the first node to retrieve from memory the total number of nodes that are lower in the tree hierarchy through the first network interface other than the network interface the data array was received from. The first node can retrieve this value from a tree representation, embodied in a data array such as but not limited to the ones in FIG. 5, or from a subset of the tree representation, as described above. In the embodiment in FIG. 3, this value is one.

The logical instructions executed on the first node proceeds to forward the first component data array of the composite data array through its first network interface, including the message type identifier. The second node receives the data array. The logical instructions executed on the second node interprets the message type identifier, and retrieves the information that there are zero nodes attached at its other network interfaces. As for the first node, this information has been embodied in a data array, following the execution of a layout detection method. Therefore, the received data array is not edited or forwarded. The data array is exactly of the size required to use as input to the logical instruction set that adjusts the optical output of the LED luminaire, which is what the second node proceeds to do. The second node creates a data array to acknowledge that it successfully adjusted the optical output and forwards this data array to the network interface that connects to the first node.

The logical instructions on the first node resumes as the acknowledgement is received and retrieves the information that there are in total two nodes or LED luminaires attached through the second network interface. The logical instructions executed on the first node proceeds to forward the second and third component data arrays of the composite data array through its second network interface, including the message type identifier.

The third node receives the data array, which includes the message type identifier and a data array double the size of a data array to use as input to the logical instruction set that adjusts the optical output of the LED luminaire. The third node, like the first node before it, initiates an iteration over its ordered network interfaces. In the illustrative embodiment of FIG. 3, that means network interface b. For that network interface there is in total one node attached, which is information that can be retrieved from the memory of the third node.

The logical instructions executed on the third node proceeds to forward the first component data array of the data array the third node received from the first node through its first network interface, including the message type identifier. The fourth node receives the data array. The logical instructions executed on the fourth node interprets the message type identifier, and retrieves the information that there are zero nodes attached at its other network interfaces. As for the third node, this information has been embodied in a data array, following the execution of a layout detection method. Therefore, the received data array is not edited or forwarded. The data array is exactly of the size required to use as input to the logical instruction set that adjusts the optical output of the LED luminaire, which is what the fourth node proceeds to do. The fourth node creates a data array to acknowledge that it successfully adjusted the optical output and forwards this data array to the network interface that connects to the third node.

The logical instructions executed on the third nodes resumes as it receives the acknowledgement, and the remaining part of the data array it received from the first node, that is the part not sent to the fourth node, is exactly the size required to use as input to the logical instruction set that adjusts the optical output of the LED luminaire. There are no other nodes attached to the remaining network interfaces of the third node. Hence, the remaining data array is used as input to the logical instructions to set the optical output of the third LED luminaire. As for the second and fourth node, the third node creates a data array to acknowledge this action and forwards it to the first node.

The logical instructions executed on the first node are resumed as it receives the acknowledgement. As for the steps taken by the third node described above, the first node uses the remaining data array as input to the logical instructions to set the optical output of the first LED luminaire. A data array to acknowledge this execution is sent to the controller. The controller, upon receiving said data array, can interpret it as a successful bulk update.

An important feature of these logical instructions for a bulk update is that the composite data arrays are ordered in a particular manner. In the embodiment described, the order of the data arrays in the composite data array is: data array for second LED luminaire first, data array for fourth LED luminaire second, data array for third LED luminaire third, and data array for first LED luminaire last. With this order, the logical instructions for bulk update can omit comparisons of data arrays that include the node identifier in a header, as was required in the communication protocols described above. With this order, the logical instructions for bulk update can use cut-through switching to great effect and can thus neglect to store large data arrays in memory, or neglect to execute logical instructions to ascertain authentication, complex editing and similar tasks as described above. Similar to above descriptions, the cut-through switching that forwards the data arrays, can employ smaller units of data in its forwarding. The illustrative embodiment above used units of data the size of an entire data array as in FIG. 1. The logical instructions can as well forward individual elements or bits of the data array as it is received, as long as the node that receives the bits of data correctly forwards subsets of the plurality of elements or bits, and compiles the required data array input to the logical instructions to set the optical output.

In an example case, the logical instructions for bulk updates are illustrated in FIG. 7 and described next. The controller creates the composite data array 701 that is comprised of one message type identifier and one or a plurality of data arrays of the format or encoding required to adjust a certain state of the nodes, where the number of data arrays in the plurality is equal to the number of nodes in the data network. The controller forwards the composite data array to the first node 702.

The given node initiates an iteration over its occupied network interfaces 703. Each node can access at least the necessary information about the topology, such that only occupied network interfaces are part of the iteration. If the iteration has not reached its end, the total number of nodes connected to the given network interface, M, is ascertained 704, which can be done by retrieving this number from the memory of the given node. The internal clock is started 705. The microprocessor of the node proceeds to forward the message type identifier as well as the M first data arrays of the composite data array the given node has received, or is in the process of receiving, to the given network interface 706.

At this point in the execution another node, lower in the tree hierarchy receives a data array composed as what the previous node received, only smaller in size, and this node initiates its iteration over the ordered occupied network interfaces 703. This sequence of logical instructions are therefore dividing the composite data array into smaller pieces and perform a recursion to nodes lower in the tree hierarchy.

At some point in the execution, a given node will reach the end of the iteration over occupied network interfaces the given node initiated in an earlier step. The end of the iteration can be reached either because the node lacks occupied nodes, which is the case for a terminal node, or because the iteration has exhausted the ordered set of network interfaces. At this step the remaining data array should be comprised only of one data array to set the state of the node. The logical instructions guarantee this, as long as the representation of the topology corresponds with the actual topology, since other parts of the data array have been forwarded to other nodes or plurality of nodes. If there is a discrepancy, the logical execution can end with an error 707.

If on the other hand only one appropriately encoded data array remains, this is used as input to a set of logical instructions that sets the state, as specified by the data array, of the given node 708. The same node creates a data array that contains the acknowledgement that the state was set, and that data array is forwarded through the network interface that leads up in the tree hierarchy 709. This step therefore implies a step upwards in the hierarchy of nodes.

A given node that has forwarded a part of the composite array to a node lower in the hierarchy 706 can be idle while waiting to receive an acknowledgement data array from the same interface. If the internal clock exceeds a threshold, the execution can be terminated with an error 710. This step can ensure that communication failures in the data network do not lead to indefinite executions of bulk update logical instructions. If the internal clock did not exceed a threshold, the execution can proceed by taking the next step in the iteration over the ordered set of network interfaces for the given node 711.

The logical instructions are back at testing if the occupied network interface iteration is at its end. If not, the steps described above to do another division of the remaining composite array 706 and begin another recursion down in the hierarchy can be taken. If the end is reached, the steps described above to set the node state 708 and to create another acknowledgement data array 709 and take a step up in the hierarchy can be taken.

Nodes that are not terminal nodes reach the latter stage after an iteration over its occupied network interfaces has concluded. The logical instructions ensure that a given non-terminal node with K number of total nodes connected through its plurality of network interfaces receives a composite data array from the node above it that is comprised of K+1 data arrays. Therefore, the non-terminal node, after its iteration over occupied network interfaces concludes, is left with one data array that is used to set the state of the given node.

The logical instructions with its recursions up and down the tree hierarchy reach the end once the acknowledgement data array reaches the controller. At that stage the composite data array originally created by the controller 701 has been divided into smaller composite data arrays at each node in the plurality of nodes of the data network. The acknowledgement data array can be used to create a confirmation at a user interface that the bulk update was completed, or through another adjustment of an operational parameter of the controller. Conversely, a failure to obtain an acknowledgement data array by the controller within a set time can lead to the creation of an error message, or through another adjustment of an operational parameter of the controller.

An important feature of these logical instructions for a bulk update is that the composite data array is comprised of data arrays that are ordered in a particular manner. From the known tree topology, with its representation embodied in some data array, along with the ordered set of network interfaces, as well as the logical instructions, which split a data array in a predictable manner, the appropriate order can be inferred. For example, the first data array in the composite data array should be the data array that is intended for the node Z that is connected to the first occupied network interface of the node Z−1 above node Z in the hierarchy, which is connected to the first occupied network interface of the node Z−2 above node Z−1 in the hierarchy, and so on until the recursion ends at the controller.

With this order, the logical instructions for a bulk update can omit comparisons of data arrays that include the node identifier in a header. With this order, the logical instructions for bulk update can use cut-through switching to great effect and can thus neglect to store large data arrays in memory, or neglect to execute logical instructions to ascertain authentication, complex editing and similar tasks as described above. Similar to above descriptions, the cut-through switching that forwards the data arrays, can employ smaller units of data in its forwarding. The earlier description of FIG. 7 can be re-interpreted such that the division of the composite data array is done in units of individual elements or bits rather than in units of data arrays of the size to set the state of a node.

In the embodiment illustrated in FIG. 7, each node pauses its execution while it forwards the data arrays to nodes lower in the hierarchy. In some embodiments there is no pausing. Instead the node after it has forwarded data arrays through one network interface proceeds to execute logical instructions that pertains to the subsequent network interface in the ordered set. Each node can in these embodiments receive an acknowledgement data array through one of its network interfaces, while the microprocessor of the given node is busy executing other logical instructions. This can yield a quicker bulk update. The execution of the logical instructions is thus parallelized over the plurality of microprocessors in the data network rather than executed in sequence. Parallel processes creates other conditions to handle, such as how the plurality of events are synchronized as their respective output data arrays have to be joined. This embodiment of the logical instructions therefore can lead to additional complexity of the execution in order to handle events such as, but not limited to, receiving a data array from two or more network interfaces concurrently. There are known methods to handle these types of conditions, which can be organized under the name concurrency control. Any method that adequately addresses the additional complexity of concurrent processes can be used in an embodiment.

In the logical instructions above, at no step is a unique node identifier referenced. In FIG. 3 that corresponds to that the Roman numerals 202 are not retrieved from memory. That means that in a data network, which is bulk updated as described above, node identifiers are not necessary, and in some embodiments the node identifiers are absent. In other words, no node identifier is assigned during manufacturing or during initialization of one or a plurality of the nodes of the data network. This property of the data communication method can imply a simplified manufacturing, fewer logical instructions in need of execution, as well as a more compact representation of the control data array. These are all advantageous properties in that they allow a reduced cost of manufacturing, reduced time to execute commands, and a faster transmission of data throughout the data network, respectively.

The bulk update method can be used to update one or a subset of the nodes in a data network. The data array corresponding to the nodes that should not be updated can be set to be equal to the current state. The data array corresponding to the nodes that should not be updated can be set to some dummy value, which when used as input to the logical instructions executed on the given microprocessor leads to that the logical instruction set to update the state of the node is never executed. The dummy value can be a negative value, such as but not limited to −1 or −99. In a similar manner, if only nodes of a certain type are to be updated, a dummy value can be used at the relevant place in the composite data array for node types of another type, as obtained from a previous layout detection.

The tree topology and its explicit representation can be used in logical instructions that are distinct to the bulk update method in order to update the state of an individual node. An illustrative embodiment that uses this feature for the network of LED luminaires in FIG. 3 is described next. The use-case relates to a single update of the optical output of all LED luminaires.

First the controller creates a composite data array comprised of a message type identifier, which in a dictionary maps to a logical instruction set for single update, to be described. The composite data array is furthermore comprised of the data array, which can be used as input to the logical instructions, which sets the optical output of the LED luminaire. The composite data array is furthermore comprised of a data array that contains a value that can be called target index. The target index corresponds to a single LED luminaire in the data network. The target index maps uniquely to the place in the ordered set of LED luminaire in the tree topology representation. For example, if the third LED luminaire in FIG. 3 should be updated with respect to its optical output, the target index can be 2. The target index can be different from the node identifier, if a node identifier is present in a given embodiment. The composite data array also contains an integer, which is initialized to zero by the controller. The integer can be called node counter.

The composite data array is forwarded by the controller to the first node or LED luminaire. The message type identifier is interpreted and maps to a logical instruction set for single update. The first LED luminaire retrieves the total number of LED luminaires attached through the first network interface in the ordered set of network interfaces for the first LED luminaire. In the illustrative embodiment of FIG. 3, that value equals 1. This value is added to the current value of the node counter and a new integer is obtained, which can be called provisional counter. In the illustrative embodiment of FIG. 3, the provisional counter is 1, given that the node counter is zero at this stage of the execution.

The provisional counter is compared against the target index of the received data array. If the target index is strictly less than the value of the provisional counter, the data array is forwarded through the given network interface. Note that the forwarding does not alter the node counter. At the second LED luminaire, the message type identifier is interpreted and the logical instruction set for single update is executed. The second LED luminaire is a terminal node, hence the provisional counter in this case equals zero. It is compared against the target index of the data array the second LED luminaire received. If the target index equals the provisional counter, that is in this case both are zero, the remaining part of the data array is used as input to the logical instruction set that upon execution updates the optical output of the given LED luminaire. An acknowledgement data array can be created and forwarded through the network interface that leads to the first LED luminaire, and there forwarded through the network interface that leads to the controller.

If instead the provisional counter obtained by the first LED luminaire is found to be greater than or equal to the target index, nothing is forwarded through the first network interface. Instead the node counter data array is edited to equal the provisional counter, in this illustrative embodiment that is 1. After that operation, a similar subset of logical instructions are executed for the second network interface of the first LED luminaire as was done for the first network interface of the first LED luminaire. In other words, a provisional counter is created from the value of the current node counter by incrementing its value by the total number of nodes attached through the second network interface of the first LED luminaire. In the illustrative embodiment of FIG. 3 the increment equals 2, and hence the provisional counter at this stage equals 3. As above, if the target index is strictly less than the provisional counter, the composite data array is forwarded through the second network interface of the first LED luminaire. Note that the forwarding does not alter the node counter.

Given that the inequality between target index and provisional counter is true, the third LED luminaire receives the composite data array and executes the logical instruction set associated with the single update message type identifier. In one illustrative embodiment, the target index equals 2. The provisional counter is created by the addition of the node counter, which is 1 at this stage of execution, and the total number of nodes attached through the first network interface of the third LED luminaire, which is 1. Hence the provisional counter is 2. This value is not strictly less than the target index. Therefore, nothing is forwarded to said network interface. As described above, the node counter is also edited to equal the value of the provisional counter.

The third LED luminaire has no other LED luminaires attached at any of its other network interfaces. The node counter has reached the value 2, exactly equal to the target index. This equality leads to that the data array that contains instructions for the desired optical output are used as input to the logical instructions to set the optical output of the third LED luminaire. As before an acknowledgement data array can be created and forwarded recursively to the controller.

In the general case, the logical instructions for single updates are illustrated in FIG. 8 and described next. The controller creates a composite data array 801 that is comprised of a message type identifier, a first integer, that can be called the target index and a second integer initialized to zero, that can be called the node counter, and a data array that can be used as input to a node in a data network to set its state. The composite data array is forwarded 802 and the first node in the data network receives it.

The given node initiates an iteration over its occupied network interfaces 803. Each node can access at least the necessary information about the topology, such that only occupied nodes are part of the iteration. If the iteration has not reached its end, the total number of nodes connected to the given network interface M is ascertained 804, which can be done by retrieving this number from the memory of the given node. The node counter N is retrieved from the received composite data array. The two integer values are added, M+N 805. This sum can be assigned to another integer that can be called the provisional counter V.

The provisional counter is compared against the target index, which is retrieved from the received composite data array. If the target index is strictly less than the provisional counter, the composite data array as received by the given node is forwarded through the given network interface 806. The node that receives the composite data array starts the execution of the same logical instruction set as the previous node, that is an iteration over the ordered set of occupied network interfaces is initiated 803.

If on the other hand, the provisional counter is of such value that the target index is not strictly less than the provisional counter, another subset of logical instructions are executed for the given node. First the node counter of the current composite data array is edited such that it equals the value of the provisional counter 807. In any step in the execution of logical commands after this, the value of the current node counter once retrieved from the composite data array will equal this new value, until a step 807 is encountered anew, upon which the value is edited again. After this, the iteration over the ordered set of occupied network interfaces for the given node selects the next network interface 808.

At some point in the execution, a given node will reach the end of the iteration the given node initiated in an earlier step. The end of the iteration can be reached either because the node lacks occupied network interfaces, which is the case for a terminal node, or because the iteration has exhausted the ordered set of network interfaces. In that event, the node counter should equal the target index. This is a consequence of the logical instructions, and the only reason that would not hold is if the representation of the topology is inconsistent with the real-world topology. Given the equality between target index and node counter, the data array that is used to set the state of the given node is used as input to the logical instructions to set the state of the node 809. Once complete, an acknowledgement data array can be created and forwarded to the network interface leading to a node higher up in the hierarchy 810. This forwarding can be done recursively until the controller receives the acknowledgement data array. The acknowledgement data array can be used to create a confirmation at a user interface that the bulk update was completed, or through another adjustment of an operational parameter of the controller. Conversely, a failure to obtain an acknowledgement data array by the controller within a set time can lead to the creation of an error message, or through another adjustment of an operational parameter of the controller.

An important feature of the method of some embodiments for single update is that the topology of the data network, and the order it defines for the plurality of nodes, is used to create an efficient transport. The bulk update, as described above in relation to FIG. 7, relies on this order of nodes to split up its composite data array in an efficient manner, such that the correct instructions arrived at the specified node. The single update method, instead of doing the split up, uses a target index and a provisional counter to test if the path to the specified node goes through any given network interface of a given node. The path testing, which is done by simple increments and comparisons of integers, can therefore efficiently discard paths and hence reduce the number of logical instructions each node has to execute.

The path testing for the single update method is done throughout the data network by executing the logical instruction set described above, and illustrated in FIG. 8, on the plurality of nodes. In some embodiments, the path testing can be done on the controller. In embodiments where the controller has the complete information of the tree topology, the logical instructions wherein the provisional counter, a target index and a node counter are incremented and compared as above, can all be executed on the controller. The controller can thus infer the path the data array of the single update should use. The controller can in these embodiments instead generate a composite data array, which is comprised of a message type identifier, the data array to update the state of a node, and a data array of an ordered plurality of network interface identifiers. For example, a data array, such as [c,b], can by logical instructions executed on the nodes of the data network, be interpreted to mean that the given data array should proceed by network interface c of the first node, and by network interface b of the second node, in order to reach the specified node. Since the network interfaces are ordered, a data array such as [1,1,3], can by logical instructions executed on the nodes of the data network, be interpreted to mean that the given data array should proceed by the first network interface or the first node, and then by the first network interface of the second node, and then the third network interface of the third node, in order to reach the specified node.

Other data arrays to embody a path through a plurality of network interfaces can be contemplated. The important feature of all embodiments of the single update method is that the known tree topology enables logical instructions that upon execution ensure an efficient route to the intended node with few logical steps executed on the path there, and no logical steps are executed for nodes not on the path.

As described in an earlier section, the data network can be comprised of sensors as well as actuators. The bulk update and single update methods are means to transport instructions from the controller throughout the data network. That can include, but is not limited to, changing optical output of a plurality of LED luminaires, changing the intensity of audio coming from a plurality of speakers, changing the intensity of climate control devices, such as fans and radiators, changing the spatial configuration of a robotic arm. The known tree topology can be used for the retrieval of sensor data, that the plurality of nodes generates, and their transport to the controller for further processing.

An example scenario of the logical instructions for the bulk pull method is shown in FIG. 9. First the controller generates a data array that is comprised of a bulk pull message identifier, which maps to a logical instruction set for bulk pull of the state of the nodes 901. The controller forwards this data array 902. The first node receives the data array and interprets the message identifier as a bulk pull, and the following logical instruction set is executed. The given node initializes an empty data array 903. This data array will become populated with one or a plurality of node state data arrays as the execution proceeds. The execution of the logical instructions next starts an iteration over the occupied network interfaces 904. As in the other methods described above, the network interfaces that are occupied is known from the topology.

If there is an occupied network interface, the given node start the internal clock 905. After that the data array with the bulk pull message identifier is forwarded through the given network interface 906. At this step in the logical instructions the second node begins its execution by initializing its instance of the empty data array to be subsequently populated with one or a plurality of node state data array 903.

If the iteration over the ordered set of occupied network interfaces ends, either because the given node is a terminal node without any occupied network interfaces, or because the ordered list of network interfaces has been exhausted, the execution proceeds to retrieve the data array that embodies the current state of the node 907. This data array can be a single integer, a plurality of integers, or a large and complex data array, depending on how the state of a given node is embodied. The entity that embodies the current state of the given node can be described as the state data array. The first data array for the given node, originally initialized in an earlier step 903, is edited such that the state data array is added to the first data array of the given node 908. The composite data array thus obtained is forwarded to the node above the given node in the hierarchy 909.

In case the node that receives that data array is not the controller, the internal clock is stopped. The duration between forwarding the data array with the message identifier for bulk pull 906 and receiving a composite state data array from the same network interface 909 can be required to be below a threshold, in order to ensure the execution of a bulk pull does not proceed beyond a reasonable time. Failure to meet this condition can be due to an error somewhere in the data network, and hence the bulk pull execution is guaranteed not to be of an indefinite duration.

In case the composite state data array is received within the threshold duration, the composite data array of the given node is edited, such that the composite data array received from the one or a plurality of nodes below in the hierarchy is added to it 910. In this way the composite data array of the given node contains all the state data arrays of the nodes lower in the hierarchy through the given network interface, wherein the order of the state data arrays of the composite data array follows a convention. The execution on the given node then attempts to take another step in the iteration over the ordered set of network interfaces 911.

If there is another occupied network interface for the given node, the same recursion down into the tree as described above takes place, steps 905 and 906. Eventually, this recursion leads to the creation of a composite data array, which is received through the given network interface once the corresponding steps for the upward recursion in the tree are reached, step 909. The composite data array of the given node is therefore further extended. This continues until the given node has no other occupied network interfaces to iterate over. At that stage, the given node retrieves its own state data array 907, and adds it to the composite data array. These steps continues until the upward recursion reaches the controller. The composite data array thus received by the controller contains all state data arrays of the nodes in the data network, ordered by a convention.

The convention of the ordering is a consequence of the tree topology and how it is represented in a data array. Therefore, any further logical instructions to be executed on the controller can determine which node in the data network generated which state data array. The determination is done without a comparison or other logical interpretation of a header with such information encoded explicitly as a data array. The communication method thus enables embodiments that have no explicitly encoded node identifiers, set either during manufacturing or during network initialization. Furthermore, the data array to encode the control instructions are compact, and can hence be transported relatively quickly between nodes and throughout the network. That means the data rate is higher than in methods without the explicit consideration and exploitation of the tree topology, as described above.

The logical instructions illustrated in FIG. 9 can, similarly to the other methods described above, be modified with respect to certain aspects without deviating from the scope and spirit of the invention. In some embodiments the use of the internal clock is modified or entirely removed, such that error checking are either ignored or done by other means. In some embodiments the composite data array that is gradually extended during execution of a bulk pull is forwarded down in the tree hierarchy along with the message type identifier, and edited by another microprocessor in the plurality of nodes than the one defined by the logical instructions illustrated in FIG. 9. This means moving the tasks in 910 to somewhere earlier in the execution.

In some embodiments a given node can, rather than waiting to receive a data array from a given network interface after forwarding the bulk pull data array, proceed to forward the bulk pull request to its other occupied network interfaces. This embodiment can yield a quicker return of the composite data array to the controller. The execution of the logical instructions are hence parallelized over the plurality of microprocessors in the data network rather than executed in sequence. Parallel processes creates other conditions to handle, such as how the plurality of events are synchronized as their respective output data arrays have to be joined. This embodiment of the logical instructions therefore can lead to additional complexity of the execution in order to handle events such as, but not limited to, receiving a data array from two or more network interfaces concurrently. There are methods to handle these types of conditions, which can be organized under the name concurrency control. Methods that adequately addresses the additional complexity of concurrent processes can be used in various embodiments.

The methods described above can be combined to perform a single pull. That is, the controller should receive the state data array of one specific node in the data network. The single update method can be adjusted to send a message identifier to request the data array of a specific node, rather than sending a data array to set the state of the specific node. Once the data array with said message identifier has been received by the specific node, and subsequently interpreted by the execution of a logical instruction set similar if not identical to the logical instruction set in step 907 in FIG. 9, the state data array is forwarded recursively upwards in the tree hierarchy, similar if not identical to the logical instruction set in step 810 in FIG. 8. Through this combination of already described logical instruction, the controller receives the given state data array.

The logical instruction sets for layout detection, bulk update, single update, bulk pull and single pull have been described with composite data arrays containing a specific number and type of constituent data array. These data arrays can embody the necessary information about the data network and the intended action in order to execute a transport according to specification. In some embodiments, the composite data array can contain additional data arrays, which can serve purposes other than the efficient transport of data in the network. Examples of other data arrays include, but is not limited to: a hop counter, which increments by some integer each instance a data package is forwarded; a checksum field, which is a value that can be used to determine if the data array was corrupted as it was transported; a version identifier, which is a value that enables a node to ensure the version of the implemented method that generated the data array is compatible with the version of the implemented method that is consuming or forwarding the data array; a header length specification, which is a value that specifies how long the data array that contains the header is; a message priority identifier, which ranks the priority of the data array, such that if there is contention for the network interfaces, the higher priority messages are processed before lower priority data arrays; a data source identifier, which specifies which node generated the data array; a security type identifier, which can be used if the payload is encrypted and the security type enables the node to decrypt the message with the appropriate method; unspecified data array, which can be parts of the composite data array but may not contain any data to be interpreted, instead it is present to enable future or custom functionality to be implemented without altering the total size of the data array of the header. A composite data array comprised of additional data arrays does not alter the salient aspects of the methods. Hence, the illustrative embodiments of the logic instruction sets as describe above and illustrated in flowcharts in FIGS. 6, 7, 8 and 9, should be understood to describe what the minimal data array and logical instructions can be in order to execute the specified command and data array transport, not as the complete specification of what the data array can contain, nor the complete specification of logical instructions that can be executed.

Inference of Tree Topology from Assembly

In some embodiments the data network is constructed through a mechanical joining of separate LED luminaires or nodes in general. In these embodiments the means to form the mechanical attachments can fully or in part coincide with the means to form the communication medium for the data network connection. This can be through a movable object of one LED luminaire or node object extending into an indentation of the other LED luminaire or node object by an attractive magnetic force above some threshold. This can be through interlocking teeth that through frictional force locks the individual units into a certain physical configuration. This can be through a separate linker that is comprised of some solid material, such as plastic or metal, and a communication medium in order to enable transfer of data between the LED luminaires or nodes in general. Other methods to create a mechanical and communication connection can be contemplated. In these embodiments it is possible the plurality of node-to-node connections is not of a tree topology, or any of its subset topologies, such as line and star topology. In particular, the plurality of node-to-node connections can form loops, such that there are more than one path between two nodes. Without some further adjustments, some of the transport methods described above may have difficulties or may not be able to function.

In the embodiment shown in FIG. 3, if upon installation, a mechanical attachment is desired between the LED luminaire with identifier II and LED luminaire with identifier IV, the network interfaces c and a, respectively become connected. This leads to a loop being formed, since a data array from the controller to the LED luminaire with identifier IV can go via the LED luminaire with identifier II as well as via the LED luminaire with identifier III.

The plurality of logical instructions sets above include iterations over network interfaces, or occupied network interfaces in particular. If during an initialization, the network interface c of LED luminaire with identifier II and the network interface a of LED luminaire with identifier IV are removed from the ordered sets of occupied network interfaces, the tree topology of FIG. 3 is recovered. This removal can be implemented as an operation on data arrays stored in memory and processed by a microprocessor, and would not require a mechanical change of the installation. It is noted that if the aforementioned pair of network interfaces are kept in the respective ordered sets of network interfaces, and instead the network interface c of LED luminaire with identifier I and the network interface a of LED luminaire with identifier III are removed from the ordered sets of occupied network interfaces, another tree topology is obtained. The latter tree topology is a line topology, which as described above is a subset of the tree topology. As before, this removal can be implemented as an operation on data arrays, and would not require a mechanical change of the installation.

The technical problem of constructing a tree topology from a set of nodes and their node-to-node connections can be referred to as finding one or a plurality of spanning trees. From graph theory it holds that a first plurality of nodes that are connected by a second plurality of node-to-node connections in a network of the mesh topology or the fully connected topology or the hybrid topology, can be transformed into the same first plurality of nodes that are connected by a third plurality of node-to-node connections in a network of a tree topology, wherein the third plurality of node-to-node connections is comprised of a proper subset of the node-to-node connections of the second plurality of node-to-node connections. Furthermore, under certain circumstances, there can be a fourth plurality of node-to-node connections, distinct from the third plurality of node-to-node connections, that applied to the first plurality of nodes also generate a network of a tree topology. Furthermore, under certain circumstances, there can be a fifth, or a sixth, or a seventh, up to a finite number, of other pluralities of node-to-node connections, that applied to the first plurality of nodes also generate networks of a tree topology. In other words, under certain circumstances there can exist a plurality of distinct spanning trees for any given data network.

There are methods to discover spanning trees, typically through execution of logical instructions. These methods can be used in order to obtain from any given data network a network of a tree topology to which the transport methods described above can be applied. That way the above logical instruction sets can be used to set or sense the states of the plurality of nodes in the given data network. Methods such as a depth-first search and a breadth-first search of mathematical graphs can be used to find one spanning tree of the plurality of possible spanning trees for a given network. An important feature of both of these methods is that it orders all node-to-node connections as the network is traversed, and any such connection that connects two nodes that already have been traversed can be removed from the set of node-to-node connections. Variations to these methods can be employed, including methods that are formulated for weighted graphs, such as but not limited to Kruskal's algorithm. Therefore, methods create at least one spanning tree can be used to edit the sets of ordered network interfaces in a given assembly of nodes, such that the connections form a network of a tree topology, without the mechanical change of the assembly.

Data Transport Method in Multilevel Network

The logical instructions for the transport method in a network of nodes of a tree topology has been described so far as using one controller and one or a plurality of nodes that can be actuators or sensors. It is the controller that initiates bulk updates or bulk pulls and other instructions. In some embodiments the network is comprised of a first type of nodes that can control one or a plurality of second type of nodes. The first type of nodes can in these embodiments act as controllers for the second type of nodes. The first type of nodes are in turn controlled by a controller. This is a multilevel network, or a network of networks.

In an embodiment of the network as a network of networks, a bulk update can be comprised of the following steps. A composite data array is created by the controller as described in relation to FIG. 7. The composite data array is transported to each of the first type of nodes, as described above and illustrated in FIG. 7. Each node of the first type receives the data array to set its state. The first type of nodes subsequently assume the role of a controller, and creates a composite data array. This data array can be a copy of the data array the given node of the first type received from its controller. This data array can be created or derived by some other logical instruction executed on the microprocessor of the node of the first type with the received data array as input. Regardless of source, the composite data array of the node of the first type is transported through its network of nodes of the second type, following execution of logical instructions as described above and illustrated in FIG. 7. The second type of nodes receives the relevant data arrays and execute some logical instructions with the data array as input. The acknowledgement data array, if one is created, by the second type of nodes, reaches the relevant node of the first type, which can initiate the execution of a logical instruction set that creates its version of an acknowledgement data array to be sent to the controller.

In some embodiments the sets of nodes of the second type are disjoint, hence there is only one node of the first type that can act as a controller for any given node of the second type. In some embodiments the second type of nodes can act as a controller for a third type of nodes. Additional levels of nodes and networks can be contemplated.

Multiple levels can be favorable to use-cases wherein the aggregation of the smallest unit of the nodes, which can be called the atomic node type, creates units of a size or granularity that better fits with the intended use. In some embodiments, LED luminaires that are mechanically and electrically joined in a grid can be individually controlled. However, they are better grouped into larger units, which can correspond with the dimensions of rooms, desk spaces, kitchen counter-tops, entrance near a door, or some other grouping that fits the spatial arrangement of functional purposes of a given space. In these embodiments, the controller can in effect instruct the optical output to change at the entrance near a door, which is transported to a node, which in turn interprets the corresponding data array as an instruction to change the optical output of plurality of LED luminaires of certain identities and spatial arrangement. The controller in these embodiments is not required to have access to the identities of the LED luminaires in the plurality. This information is delegated to another node instead. This can simplify the messages and their transport in the network, which can be facilitated by a grouping of the atomic nodes.

The grouping of the atomic nodes can be obtained from manual input through a user interface. The user of the space wherein the atomic nodes are installed can thus decide which nodes should belong together, and one of the atomic nodes can then be assigned to also serve as the controller of said group. The grouping of the atomic nodes can be obtained from an automatic grouping derived from functional data. A network can start as being comprised of atomic nodes only. The controller tracks some property or properties of how the atomic nodes are used, or the environment they sense, and on basis of this plurality of properties over time, infers a functional grouping. Other methods of automatic grouping and subsequent control can be contemplated. Regardless of the method a grouping is attained, the transport methods as described above can be used, wherein the nature of the nodes and the controller can vary, but wherein the levels of the network are connected by one of a plurality of nodes that bridges the two or more levels of the network.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Illustrative Embodiments for Lighting Control

The protocol for sensor and actuator communication of data arrays through a plurality of data connections, as described above, can be applied to lighting control systems as described next. The examples are illustrative and non-limiting, and intended to show how the protocol overcomes lighting control problems in applications in homes and offices.

Figure 10:
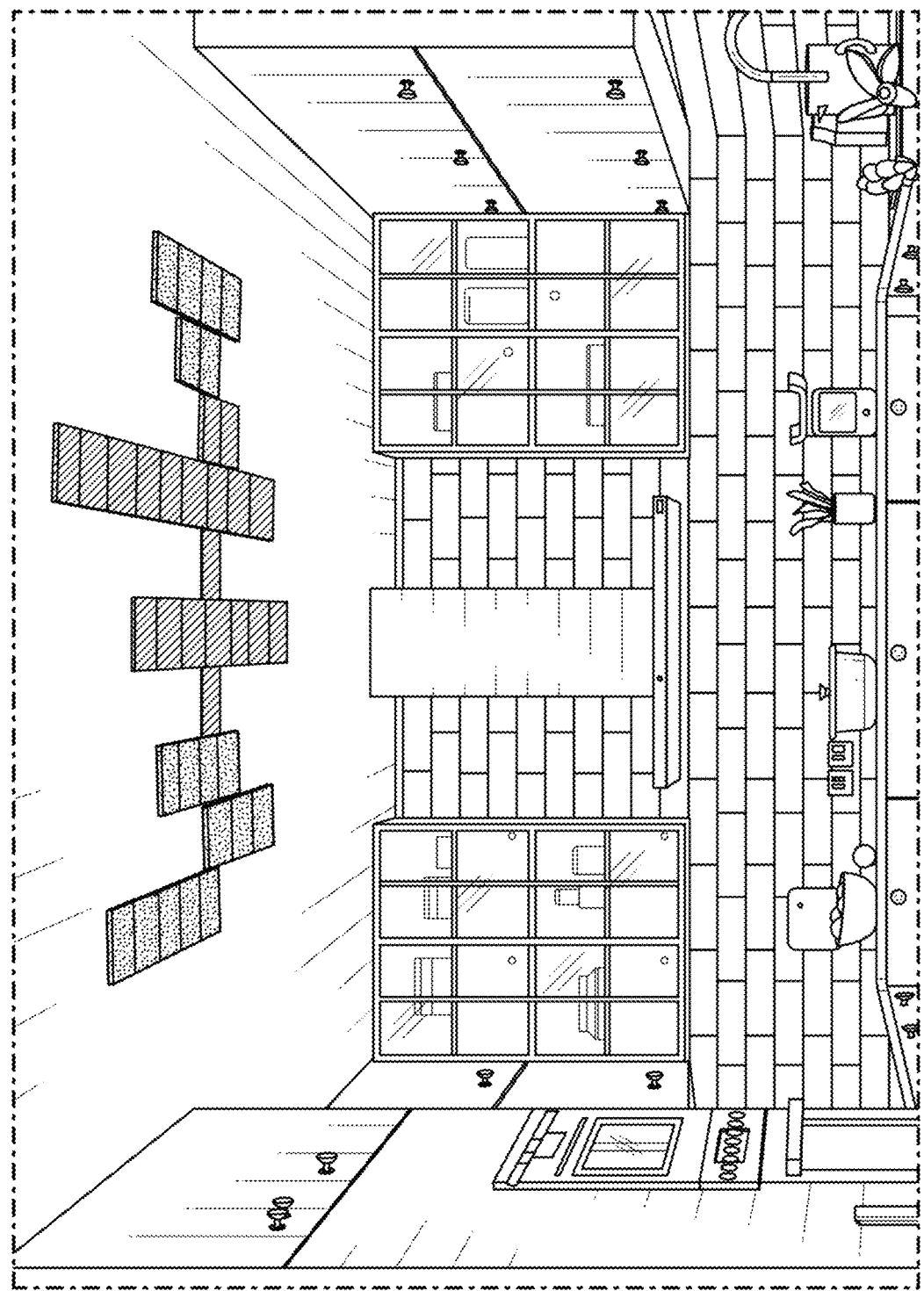
FIG. 10 is a rendering of an installation of several individually controllable light panels in a kitchen ceiling that are controlled as a unit using the data communication protocol of some embodiments.

In one illustrative embodiment a plurality of forty interconnected light-emitting panels are installed in a kitchen ceiling, see FIG. 10. The panels are individually shaped as squares with sides 15 centimeters in length. Each panel can emit light of a variable intensity, hue and saturation. Each panel is connected to at least one other panel. The geometric pattern the plurality of panels form is otherwise selected by the person who installs the plurality of panels. In FIG. 10, the pattern can be described as a set of interconnected bands, each band comprising between two and ten interconnected panels. The installation of lighting panels covers an area of the kitchen ceiling, however of an irregular shape that can provide or amplify the aesthetic or functional qualities of the kitchen. The shape can furthermore be altered by the person who uses the kitchen. The person steps onto a ladder, pulls one or more panels from the current installation and attaches one or more panels to a different side of one or more panels in the installation, the operation lasting no more than one minute.

In the illustrative embodiment of FIG. 10, one of the panels is connected by wire to the electrical grid. This panel contains in addition to the light-emitting components the hardware and software components to act as a network controller. Each panel in the installation is connected to each other panel via a small piece of an electrically conductive circuit board, which implies all panels can be supplied with electrical current to drive the light-emitting diodes and other electrical components of the given panel.

Each panel in the installation of FIG. 10 can be individually controlled. That is, the intensity, hue and saturation of its light output can at any point in time take a value distinct from any other panel in the installation. However, there are relevant applications where the intensity, hue and saturation of the light output of a given panel is optimally set as a property of the output of the other panels, or in other ways that make the installation appear to act as a unit rather than as a collection of individual light sources. The control at a basic level involves the communication of data arrays throughout the installation, in which each data array is intended for one specific panel in the installation, in which said data array instructs the panel to output a specific light intensity, hue and saturation.

In one illustrative embodiment of the lighting control of the installation in FIG. 10, all panels are constrained to output the identical light as all other panels of the installation. Each panel furthermore contains a motion sensor (e.g. passive infrared, microwave, ultrasonic, tomographic motion detector, gesture detectors). The controller contains at least a set of executable instructions that defines part of a rule engine such that detected motion in the morning should trigger all panels to switch on and emit a high intensity white light. The controller furthermore contains a set of executable instructions that defines part of a rule engine such that absence of detected motion for more than three minutes initiates a gradual dimming of the light intensity that after an additional two minutes reaches zero intensity, unless motion has been detected again in the intervening time. In order to implement this control scenario, the innovative protocol for data communication of the invention can be used as follows.

Assuming all light panels are switched off and no motion is occurring, the controller creates once every second a bulk pull request data array as described in an earlier section in relation to FIG. 9. The data array thus created contains at least one integer that denotes the instruction to a panel of the installation to report the status of its motion sensor. The bulk pull data array is forwarded to the panel directly adjacent to the controller in the data communication network. In this illustrative embodiment that is panel that physically houses the controller components. As described above in relation to FIG. 9, the first panel initializes an empty data array before it starts an iteration over its connected interfaces. In the illustrative embodiment of FIG. 10, there are two such connected interfaces, which are uniquely ordered. The first panel proceeds to forward the bulk pull request data array to the panel connected to its first network interface. The execution continues to transport the data array in the plurality of panels as described above in relation to FIG. 9, until a terminal light panel is reached, that is a panel only connected to one other panel of the installation.

At that stage in the execution the panel reports its motion sensor state. The motion sensor state can be comprised of a single binary, or a more complex data array. In one illustrative embodiment it is comprised of a data array with sixteen elements, each element comprising a floating point number that corresponds to a magnitude of a certain frequency in a sensed electromagnetic signal from the surrounding kitchen space nearest the given panel. As described in a section above in relation to FIG. 9, this data array is added to a previously created data array and then sent back upwards in the network hierarchy. Gradually a composite data array is thus created, and it includes the data arrays with motion sensor values of all panels of the installation in a particular order. The controller receives the final composite data array.

In this illustrative embodiment, the communication of the bulk pull request data array as well as the composite data array with motion sensor values is performed without any explicit comparisons of network addresses or other overhead. The protocol enables a rapid retrieval of the states of the motion sensors in the illustrative installation in FIG. 10, with a modest consumption of energy, as is desired for a lighting system that in many applications should remain switched off for extended durations, such as during the night or during normal working hours. Because of the low overhead of the protocol, the controller can frequently poll the state of the motion sensors and thus respond rapidly to motion when it finally happens, such that the light installation in FIG. 10 switches on quickly as a person enters the kitchen to use it.

In the illustrative embodiment in the kitchen of FIG. 10, in this scenario, a person enters the space moving towards the stove. The motion sensor of the panel nearest the point of entry the person used to the kitchen generates a data array that deviates appreciably from the data array it generated at the prior instance. The controller thus receives a composite data array that contains one data array with values that deviates from baseline values. The rule engine of the controller thus yields a binary output with the meaning that motion has been detected at one of the sensors in the network. This output in turn initiates the execution of instructions described above, in relation to the non-limiting example of FIG. 7. Given the constraint of the illustrative embodiment that all panels should output the identical light intensity, hue and saturation, the composite data array the controller creates is a concatenation of identical data arrays for all light panels of the installation. The identical data array can correspond to the light output for a single panel of 200 Lumens of white light of a Correlated Color Temperature (CCT) of 6500K.

The composite data array is distributed throughout the network of panels as described in a section above in relation to FIG. 7. Each panel other than the terminal panels forwards a contiguous subsection of the composite data array it receives, and each panel consumes the last data array of the composite data array it receives after all other subsections have been forwarded through the occupied network interfaces. Therefore, the light-emitting diodes of each panel receive a drive current that corresponds with the light intensity, hue and saturation of 200 Lumens at CCT of 6500K. The kitchen is thus illuminated by all forty panels of FIG. 10 within a few milliseconds of the person entering the kitchen.

As the person moves around the kitchen, performing actions such as but not limited to opening and closing the refrigerator, opening and closing cupboard doors, operating kitchen appliances, pan-frying, baking or boiling food items, moving food items from plate to mouth at a kitchen table, the motion is detected by one or several of the sensors in the lighting installation. The controller receives these motion states and the lighting remains on for the entire duration.

As the person exits the kitchen space, the controller receives a composite data array that the rule engine associates with that no motion is taking place. The controller initializes a timer that begins to count upwards. As the timer is counting the light remains on. If motion is detected anew in a manner similar to described above, the timer is reset and only started again as motion goes away. In the illustrative embodiment, if the timer reaches three minutes, the controller constructs a composite data array comprising data arrays that corresponds to the light output for a single panel of 198 Lumens of white light of a CCT of 6500K. As the composite data array is distributed throughout the data network as described above and in a section in relation to FIG. 7, all light panels in the installation dims its output light intensity by a small amount barely appreciable to the human eye. The kitchen therefore becomes a modest amount less illuminated, and the lighting installation consumes a modest amount less power.

As the timer continues to count upwards further from the three minute threshold, the dimming proceeds, and a composite data array corresponding to light output from each panel of 196 Lumens of white light of a CCT of 6500K is created and distributed by the protocol of the invention throughout the light installation in the illustrative embodiment of FIG. 10. The instructions on the controller continues in this fashion such that after four minutes of no detected motion, each panel emits 100 Lumens of white light of a CCT of 6500K. After five minutes of no detected motion, the controller creates a composite data array that corresponds to zero light output from all of the panels. The lighting installation has thus been switched off.

If at any time during the three and five minutes of the illustrative embodiment, a person enters the kitchen space and motion is detected, the controller creates the identical composite data array as it did in the previous instance described above, such that each panel again is creating light output of 200 Lumens of white light of a CCT of 6500K.

In another illustrative embodiment that employs the lighting installation of FIG. 10, the CCT is not constant at 6500K, rather it is dependent on the time of day. In some lighting applications, a high CCT, that is 5000K or above, is suitable during the morning and the middle of the day, while a low CCT, that is 3000K, 2700K, 2200K, is suitable during the evening of the day. In these applications, the controller is connected to a clock that records the time of day. This clock can either be internal to the controller, or it can be accessed via a connection to an external network. This illustrative embodiment functions with respect to motions and lack thereof as in the previous illustrative embodiment, with the key difference that the composite data array depends on the time of day, such that between 5 AM and 4 PM, the light output, if any, is of CCT 6500K, and that between 4 PM and 5 AM, the light output, if any, is of CCT 2700K.

In another illustrative embodiment that employs the lighting installation of FIG. 10, the light intensity during motion is not 200 Lumens, rather it is dependent on ambient light conditions of the kitchen. For example, during a sunny day in summer, ambient light from windows can already supply considerable amount of lighting for use of the kitchen, hence a lower amount of artificial lighting is required and ideally supplied such that energy can be conserved. Conversely, during a rainy evening in winter, ambient light from windows can be close to zero, and ample amounts of artificial lighting are required.

In this illustrative embodiment, the controller has access to an ambient lighting sensor external to the lighting network. The ambient light sensor can be installed somewhere in the kitchen, and connected to the home Wi-Fi. The controller is a gateway, and it connects to the home Wi-Fi as well. With the appropriate configuration of permissions, the controller can therefore query the external ambient light sensor for its value. Using some data communication protocol required by the home Wi-Fi, such as the TCP/IP, the ambient light value is retrieved by the controller after the appropriate routing and interpretation of address header and de-encryptions is done, and used in the following manner. If the ambient light sensor returns a value between zero and 200 lux, the data arrays of the composite data array the protocol of the innovation sends throughout the illustrative light installation of FIG. 10, corresponds to light intensity of 200 Lumens. Between 200 lux and 5000 lux, the controller instead creates a composite data array that corresponds to light intensity from each panel less than 200 Lumens. Because humans better perceive changes in light at low intensities than at high intensities, the reduction in light intensity can be non-linear rather than linear between 200 lux and 5000 lux. At 5000 lux or above, the controller can create a composite data array that corresponds to zero light intensity from the panels of the installation, even if motion is detected. This corresponds to a state where there is sufficient ambient lighting to use the kitchen.

In another illustrative embodiment that employs the installation of light panels of FIG. 10, the light output from one panel can be different from the light output of another panel. The difference can be created for both functional and aesthetic purpose. In illustrative embodiments that employs the installation of FIG. 10, panels that are near the geometric center of the installation are set to output white light of a CCT close to 6500K, while panels that are near the geometric periphery of the installation are set to output light that is a mixture of white light of a CCT close to 6500K and saturated purple light. The degree of purple in the mixture depends on where between the geometric center and the periphery the light panel is situated.

The information of the geometry of the installation is available to the controller through the network topology representation stored in memory. Different methods to represent a network topology are given in FIG. 5 and in the description above in relation to FIG. 5. From a network topology representation, the controller infers where the panels are situated relative the geometric center and periphery of the installation using Euclidean geometry.

In this illustrative embodiment, the controller executes the following instructions as motion is sensed as a person enters the kitchen. The motion is discovered and transported using the innovative protocol to the controller as described for the previous illustrative embodiment. The controller proceeds to create a composite data array to be transported according to the protocol and illustrated in FIG. 7. Unlike the previous illustrative embodiment, the data arrays comprising the composite data array are not identical. Instead each data array corresponds to some mixture of white light of a CCT 6500K and saturated purple, where the amount of saturated purple in the mixture depends on the geometric relation of the corresponding panel to the geometric center and periphery of the installation.

The innovative protocol defines a position to a certain panel within the composite data array as a function of where the panel is in the network topology. It should be noted that although the network topology can be used to infer geometric relations in the physical space of the installation, it is non-obvious where in a composite data array a data array corresponding to more or less purple should be placed. Instead, the construction of the composite data array relies on the innovation to produce a data array that can be transported without explicit address comparisons throughout the installation and still yield a geometrically precise output. Hence, the composite data array that the controller creates is a non-random combination of different data arrays, wherein the method of creation uses the topological information of the network and its correspondence to the geometry of the installation. The composite data array is sent throughout the installation as described above in relation to FIG. 7, and light output is obtained within milliseconds of detected motion, where the light from the installation is predominately white light at 6500K in the center of the installation, and a diverse mixture of white light at 6500K and saturated purple towards the periphery of the installation.

Figure 11:
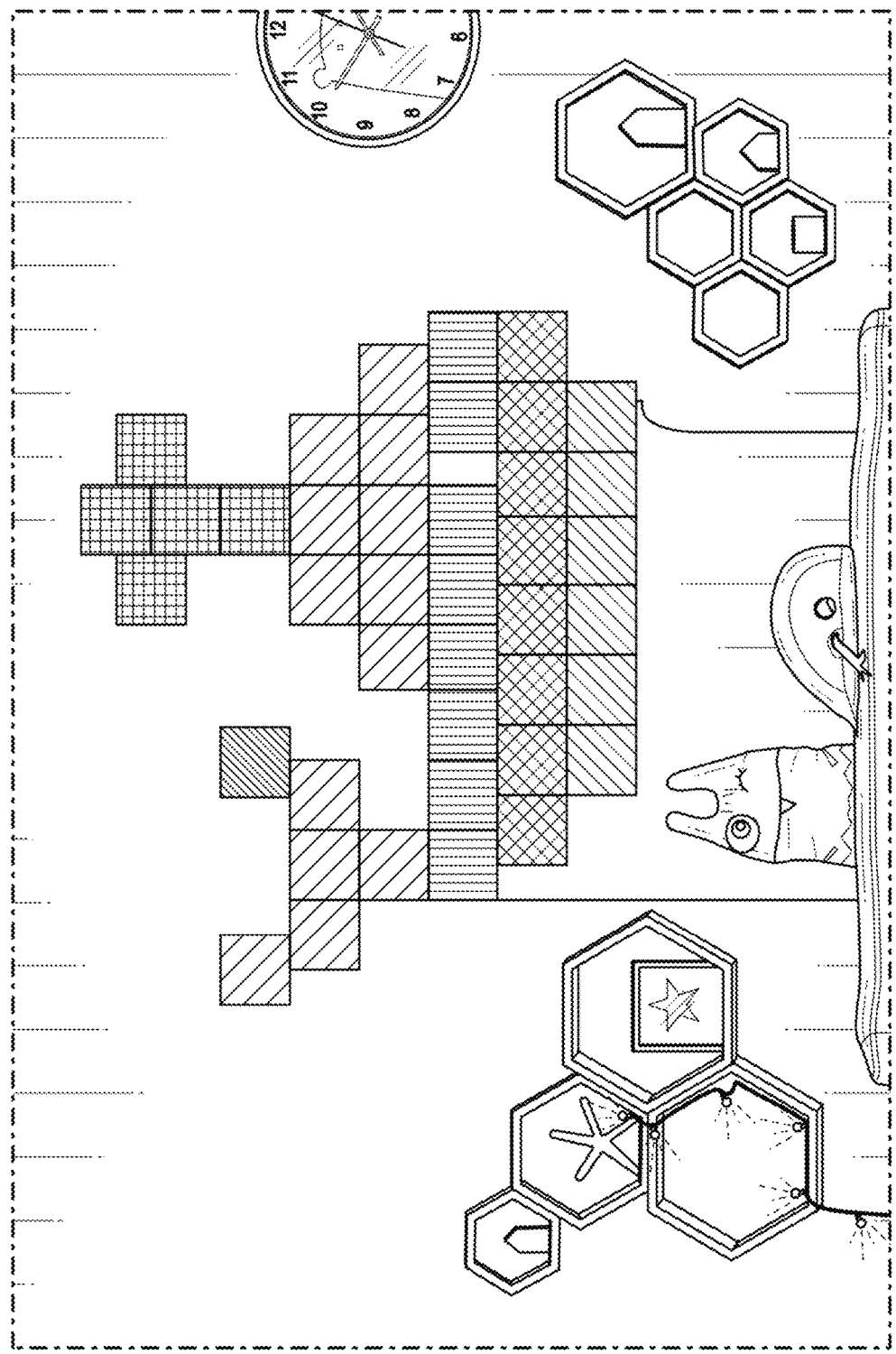
FIG. 11 is a rendering of Illustration of an installation of several individually controllable light panels on a children's bedroom wall that are controlled as a unit using the data communication protocol of some embodiments.

In another illustrative embodiment, a plurality of panels are installed on the wall of a children's bedroom, as shown in FIG. 11. The panels are individually shaped as squares with sides 15 centimeters in length. Each panel can emit light of a variable intensity, hue and saturation. Each panel is connected to at least one other panel. The geometric pattern the plurality of panels form is otherwise selected by the person who installs the panels. The installation of lighting panels therefore covers an area of the wall, however of an irregular shape that can provide or amplify aesthetic or functional qualities of the bedroom. The shape can furthermore be altered by pulling one or more panels from the current installation and attach one or more panels to a different side of one or more panels in the installation, the operation lasting no more than one minute.

In the illustrative embodiment of FIG. 11, at least one panel contains the hardware and software components to act as a network controller in addition to providing light output. Each panel in the installation is connected to each other panel via a small piece of an electrically conductive circuit board, which implies all panels can be supplied with electrical current to drive the light-emitting diodes and other electrical components of the given panel.

This embodiment illustrates additional use-cases where an efficient protocol for data array transport is beneficial or necessary. In some embodiments the panels are equipped with components to detect if they are touched. That is, if a person presses one of their fingers, multiple fingers, or the entire palm, against the surface of a certain panel, this action alters a measured capacitance, which is embodied as a data array at the particular panel that is touched.

The controller creates once every hundred milliseconds a bulk pull request data array as described in an earlier section in relation to FIG. 9. The data array thus created contains at least one integer that denotes the instruction to a panel of the installation to report the status of its capacitive touch sensor. The bulk pull data array is forwarded to the panel directly adjacent to the controller in the data communication network. In this illustrative embodiment that is panel that physically houses the controller components. As described above in relation to FIG. 9, the first panel initializes an empty data array before it starts an iteration over the connected interfaces of the first panel. The first panel proceeds to forward the bulk pull request data array to the panel connected to its first network interface. The execution continues as this and described above in relation to FIG. 9 until a terminal light panel is reached, that is a panel only connected to one other panel of the installation.

At that stage in the execution the panel reports its capacitive touch sensor state. The capacitive touch sensor state can be comprised of a single binary, or a more complex data array. As described in a section above in relation to FIG. 9, this data array is added to a previously created data array and sent back upwards in the network hierarchy. Gradually a composite data array is thus created, and it includes the data arrays with capacitive touch sensor values of all panels of the installation in a particular order. The controller receives the final composite data array.

In this illustrative embodiment, the communication of the bulk pull request data array as well as the composite data array with capacitive touch sensor values is performed without any explicit comparisons of network addresses or other overhead. The protocol enables a rapid retrieval of the states of the capacitive touch sensors in the illustrative installation in FIG. 11, with a modest consumption of energy, as is desired for a lighting system that in many applications is not being touched. Because of the low overhead of the protocol, the controller can frequently poll the state of the capacitive touch sensors and thus respond rapidly to touch.

In illustrative embodiments, the touch sensing serves a lighting control purpose as follows. The installation of FIG. 11 is assumed to output at a given point in time a certain light at some intensity, hue and saturation. The output of each individual panel can be different from any other panel, both in terms of intensity, hue and saturation, as is the case of the particular illumination shown in FIG. 11. A person in the room touches one panel with the index finger and keeps it pressed against the panel. Within no more than 100 milliseconds, the controller has received a composite data array that corresponds to that one particular panel is being touched. A rule engine that is executed on the controller yields a binary output that corresponds to the state that the installation is being touched.

The binary output of the rule engine initiates the execution of logical instructions as follows. A variable is set in memory to value 'dim down'. The controller constructs a composite data array that corresponds to the identical hue and saturation for each panel in the current lighting state, as well as to an intensity for each panel that is reduced by a linear transformation of the light intensity of the current lighting state.

The composite data array is distributed throughout the network of panels as described in a section above in relation to FIG. 7. Each panel other than the terminal panels forwards a contiguous subsection of the composite data array it receives, and each panel consumes the last data array of the composite data array it receives after all other subsections have been forwarded through the occupied network interfaces. Therefore, the light-emitting diodes of each panel receive a drive current that corresponds with the same hue and saturation as prior to the touching, but with a reduced intensity.

At this stage the controller again polls the state of the different capacitive touch sensors, and assuming the person is still pressing the panel, that state is inferred through the data array transport by the innovative protocol and rule engine evaluation as described above. The variable in memory is already set to 'dim down' and is left unchanged. The linear transformation is applied again in order to derive reduced intensities for all panels of the installation in FIG. 11. The innovative protocol is used again to distribute the new composite data array and a new lighting state is obtained with additionally reduced light intensity, hue and saturation as before.

This process of reduction continues until the panel has been pressed for thirty consecutive polling events, or in other words, for three seconds (parameters are provided as non-limiting examples). At that instance the linear transformation that reduces the intensity for the panels has by design reached zero and all light is turned off. If the person continues to press the panel, that state is inferred by the controller as above, however, it does not lead to the creation of a new composite data array by the controller and the light output remains at zero.

If at some point during the gradual reduction of the light intensity as described above, the person removes the finger from the panel, the controller receives a composite data array that is inferred to mean that no touching is present. The altered state leads to the execution of the following instructions. The present intensity, hue and saturation for each panel are recorded as the current state, and the variable in memory is switched to 'dim up'. The light from each panel is therefore left unchanged compared to the instance just prior to the finger being removed from the panel. In other words, the dimming down of the light intensity stops with the removal of the finger and a new current lighting state is obtained.

If the person at this point again touches a panel in the installation shown in FIG. 11, that state is sensed as before, the composite data array transported to the controller by the innovative protocol as before, and the state is inferred by a rule engine executed on the controller and represented as a binary. At this time, the variable in memory is already set to 'dim up', hence a linear transformation is applied to the intensity of each panel such that it is incremented to a greater value than its current value. As before, hue and saturation are left as is. The controller constructs a composite data array as instructed by the innovative protocol described above, in particular in relation to FIG. 7, and it is distributed throughout the network. Each panel is slightly dimmed up in light intensity.

At this stage the controller again polls the state of the different capacitive touch sensors, and assuming the person is still pressing the panel, that state is inferred through the data array transport by the innovative protocol and rule engine evaluation as described above. The variable in memory is already set to 'dim up' and is therefore left unchanged. The linear transformation is applied again in order to derive increased intensities for all panels of the installation in FIG. 11. The innovative protocol is used again to distribute the new composite data array and a new lighting state is obtained with additionally increased light intensity, hue and saturation as before.

This process of light intensity increase continues until the panel has been pressed for thirty consecutive polling events, or in other words, for three seconds. At that instance the linear transformation that increases the intensity has by design reached the maximum allowed light intensity and the panels are generating the maximum output for their given hue and saturation. If the person continues to press the panel, that state is inferred by the controller as above, however, it does not lead to the creation of a new composite data array by the controller and the light output remains at the maximum.

If at some point during the gradual increase of the light intensity as described above, the person removes the finger from the panel, the controller receives a composite data array that is inferred to mean that no touching is present. The altered state leads to the execution of the following instructions. The present intensity, hue and saturation for each panel are recorded as the current state, and the variable in memory is switched to 'dim down'. The light from each panel is therefore left unchanged compared to the instance just prior to the finger being removed from the panel. In other words, the dimming up of the light intensity stops with the removal of the finger and a new current lighting state is obtained.

The illustrative embodiment described above shows how a lighting installation containing rapid and efficient sensing and actuation enables a flexible means to control its output. The installation of FIG. 11 is therefore its own light switch. If the polling of the capacitive touch sensor is infrequent, such as once every other second, or only applied to a small subset of touch surfaces, such as a single button near the controller, the overhead and energy consumption of the lighting installation is reduced, but at the cost of functionality. With the efficient and rapid protocol for data array transport, the capacitive touch sensors can be polled at a higher frequency and at several locations of the installation.

In another illustrative embodiment, the sensing of capacitive touch and the transport of that data from the panels of the installation of FIG. 11 to the controller is the same as above, that is it uses the aspects of the innovative protocol described in relation to FIG. 9. However, in this illustrative embodiment, the precise information of which panel is touch is used in the creation of the actuation command. Therefore, in this illustrative embodiment, the controller receives a composite data array wherein one data array that comprises the composite data array indicates a panel is being touched. Because of the innovative protocol and the order it imposes onto the network topology, the position within the composite data array of the one data array corresponds to one known panel of the installation in FIG. 11. For illustrative purposes assume it is the leftmost panel in FIG. 11 that is being pressed.

Given that the controller has inferred from the bulk pull data array that the leftmost panel is being touched, the controller proceeds to construct a single update composite data array as described above and in particular in relation to FIG. 8. The leftmost data array has a unique and known position within the network topology. The controller sets the target index integer in the composite data array accordingly. The composite data array is also constructed to include a data array that corresponds to a random hue and saturation at maximum light intensity. The composite data array thus constructed is transported according to the innovative protocol. In short, the first panel directly adjacent to the controller determines which network interface to send the received composite data array through. Other panels lower in the hierarchical network topology performs a similar computation in order to select which of its occupied network interfaces to send the received composite data array through. This proceeds until the equality condition between the target index and the node counter is met, at which point the corresponding panel is set to output the randomly selected hue and saturation at maximum light intensity. By the design of the innovative protocol, this panel is the panel that is being touched.

The method to change the light output can be a bulk command instead, as described above and in particular in relation to FIG. 7. In this case the composite data array is comprised of data arrays to all panels in the installation of FIG. 11. However, only one of these data arrays implies a different light output than the present light output, that is the light panel that is being touched.

The precise location of the panel that is touched within the installation of FIG. 11 is efficiently transported to the controller by the protocol, and a modification of the light output at that precise location is performed. The time it takes to perform this sensing and actuation can be very short, and depends on the frequency of the microcontroller. However, since the operations required to precisely sense and actuate do not include explicit address comparisons or other transport overhead, the data array transport is very efficient and the delay between touch and light adjustment can be a matter of milliseconds or less.

The visualization of music or sound is another illustrative embodiment where the delay between sensed signal and geometrically precise actuation must be low for the intended application. As described in the patent in Application No. PCT/CA2017/050500, there are methods wherein a mechanical wave sensed by a transducer membrane is mapped onto a spatially distributed light output. In other words, speech, music or other ambient sound at a given point in time leads to a light output from a light installation as in FIG. 11 that leads to an audiovisual configuration that amplifies the subjective sensation, aesthetic or otherwise. Significant latency between the sensed sound signal, such as a drum beat, a crescendo, a vibrato, and the corresponding light output, reduces the amplification of the subjective sensation, or possibly even dampen it, given the lack of harmony between audio and visual output. The innovative protocol is therefore suitable since it enables rapid transport of spatially precise sensing and light actuation data arrays.

In another illustrative embodiment light panels as in FIGS. 10 and 11 are installed in the ceiling of a 3,000 square foot office space. The panels therefore form a spatially very extended network. The exact configuration of the panels can vary, and the installation is not required to cover the entire area of the ceiling as long as all panels are connected to each other via their network interfaces. In illustrative embodiments, the installation is comprised of clusters of connected panels near work stations, and bands of panels that connect clusters together and are situated above corridors or other elongated transport areas within the office space.

As in the illustrative embodiment of FIG. 10, the panels are equipped with motion sensors. The controller can therefore determine in which areas of the office there is motion. In the illustrative embodiment, if there is motion detected at panels at one of the terminals of a corridor in the office, the controller associates that state with the switching on of all light panels assigned to that corridor. In other words, a light panel can switch on without itself sensing motion as long as at least one panel within a band of panels of the installation senses motion. Consequently, light panels are switched on in anticipation of where light will become functional.

Similarly, one or several clusters of panels in the office space can switch on as a function of certain movement of some spatial nature, not only motion at the cluster that is switched on. Furthermore, since clusters of light panels are associated with specific desks positioned at some location in the office space, the hue, saturation and light intensity of a cluster can be adjusted to the person who works at said workstation. For example, in illustrative embodiments, office workers set their preferred hue, saturation and intensity through a graphical user interface. These values are communicated via a local office network, such as the office Wi-Fi, to a database. The controller of the network of light panels, following necessary configurations of permissions, can access said database since it is a gateway. As motion is detected near a relevant cluster of light panels, the controller switches on the light panels of the cluster. The switching on involves the steps of retrieving the preferred light output from the database, constructing the composite data array that corresponds to both the position of the cluster of panels within the network topology, as well as the personalized lighting output, and transporting the composite data array throughout the network according to the innovative protocol.

For spatially extended networks like an entire office space, efficient data transport is beneficial. For personalized spaces where lighting serves a functional purpose, spatially precise and event-driven control of lighting is beneficial. Both features are greatly aided by the current innovative protocol.

The panels of FIG. 11 are rectangular, and may include modular panels having four sides each. Each of the sides can include interface ports, in this example, but variations are possible.

For example, other numbers of interface ports are possible, and may, for example, vary depending on a number of sides of a modular electrical component (e.g. an LED luminaire). For example, such modular electrical components may include triangular, rectangular, pentagonal, hexagonal, heptagonal, octagonal, nonagonal, decagonal, etc. panels, and a portion or each of the sides of such panels may include interfaces which need ordering assigned for improved data transport. In some embodiments, there may also be one or more sides that do not have interfaces (e.g. a hexagonal module does not necessarily have six interfaces).

Figure 12:
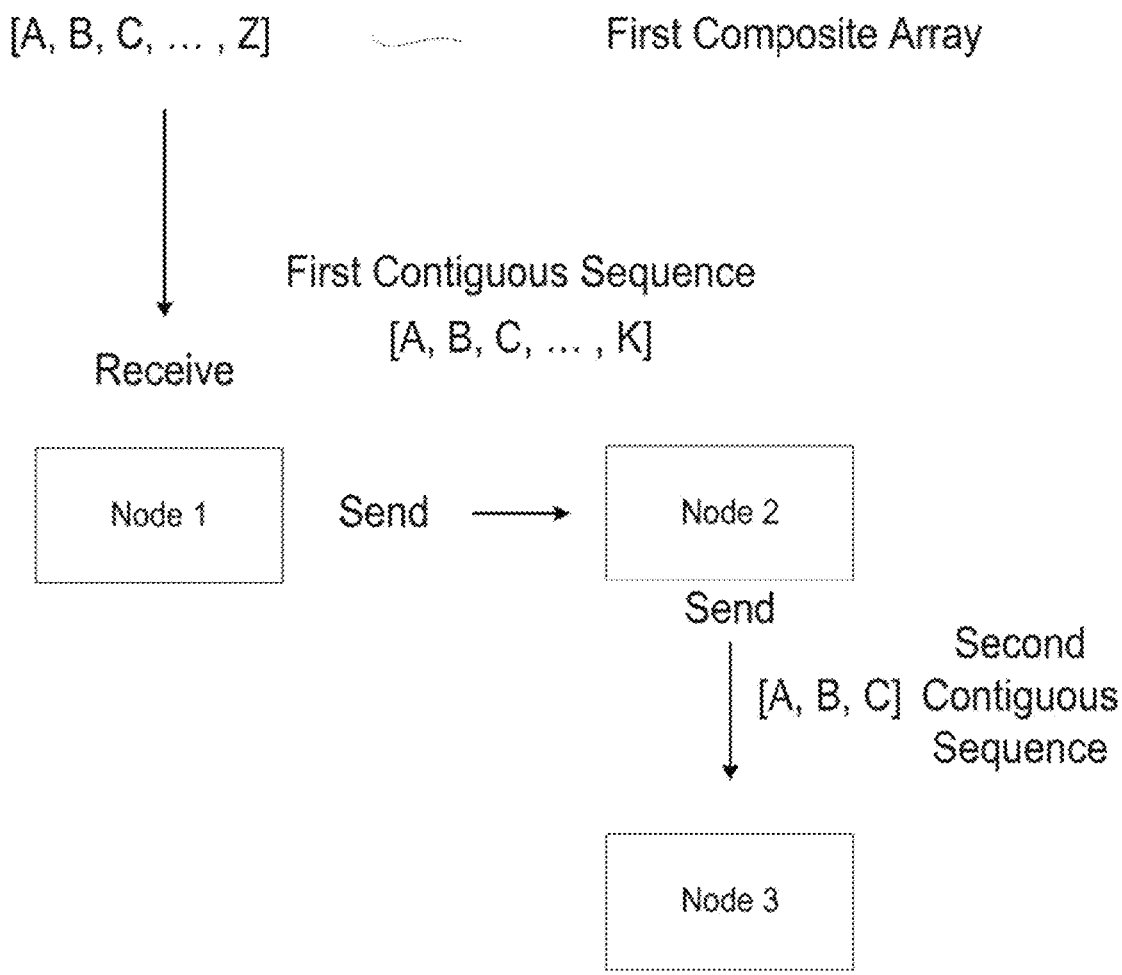
FIG. 12 is an example illustration showing an embodiment of a contiguous sequence, according to some embodiments.

FIG. 12 is an example illustration showing an embodiment of a contiguous sequence, according to some embodiments.

In this example, The first composite data array is comprised of ordered content, in the example the characters A, B, C and so on up to Z. The first node receives this composite data array. Using the protocol, a first contiguous sequence of the composite data array is created.

The significance of the word "contiguous" is that (1) the sequence is ordered and (2) that it overlaps with one stretch of the content of the first composite data array. If viewed in terms of minimal set operations, the first contiguous sequence can therefore be obtained by simply defining one lower bound and one upper bound to be applied to the content of the first composite data array.

Accordingly, a sequence that is constructed by, say, combining [A, C, D, X, Z] would be ordered, but not be a contiguous sequence of the first composite data array. This process continues recursively. That is, a second contiguous sequence is constructed from the first contiguous sequence by applying the same type of minimal set operations.

That will in effect decompose the first composite data array (or the ordered content comprising the first composite data array), into contiguous sequences. For the purposes of this description, these are denoted as minimal set operations in order to create new sequences, "splitting" a sequence.

In addition, this plurality of contiguous sequences are for one given node, non-overlapping. In other words, any single unit of content of the first composite data array that has been received through a first network interface of a given node, call that unit of content Ω, will only be sent through at most one other network interface of the same given node. It is possible it is sent through no network interface, since this unit of content can be intended to be consumed by the one given node.

"Non-overlapping", in some embodiments, is a property implicit in some embodiments. A given sequence of data is split such that a node has into smaller chunks in the manner described above.

Hence, any one unit of content will only exist in one such sequence. In the non-overlapping embodiment, the transport of data then becomes more efficient, but it is strictly not necessary.

An alternate embodiment would be to add a common unit of content to all sequences and ignore that common unit in any further computation. Then strictly the sequences are overlapping, but the innovative aspects of some embodiments are still applicable.

What is claimed is:

1. A method for transporting a plurality of data arrays in a data network comprising a plurality of nodes, and comprising a plurality of connections between nodes,
wherein a node in the plurality of nodes is comprised of a plurality of network interfaces for sending and receiving data arrays, and
wherein the connections between nodes of the plurality of nodes are formed through pairwise joining of a plurality of network interfaces of the nodes, wherein a network topology of the connections is a tree topology;
the method comprising:
assigning a first order to the plurality of network interfaces for all nodes in the plurality of nodes;
determining a second order for the plurality of nodes as a function of the network topology and the first order for the plurality of network interfaces;
generating a first composite data array by a concatenation of a plurality of data arrays, wherein a first and a second data array in the first composite data array are in an equivalent order to each other as a corresponding pair of nodes in the second order; and
transmitting the content of a first composite data array throughout the data network, wherein each node receives from at least one other node connected through a first network interface, a first contiguous sequence of the first composite data array, and each node sends to other nodes connected to said each node through a second network interface a second contiguous sequence of the first composite data array, wherein the second contiguous sequences are constructed from the first contiguous sequence as a function of the first and second order
wherein the function relating the first and second contiguous sequences of the first composite data array includes at least one of:
(i) splitting the first contiguous sequence into a plurality of new sequences, equal or greater in number than a number of connected network interfaces of the node, and assigning the second contiguous sequence as a new sequence of the plurality of new sequences in an equivalent order relative to other new sequences as the second network interface to the other network interfaces in the first order; or
(ii) aggregating a plurality of sequences of data arrays, equal or greater in number than the number of connected network interfaces of the node, wherein the second contiguous sequence is the sequence in an equivalent order relative to other sequences as the second network interface to the other network interfaces in the first order, and assigning the aggregated sequences as the first contiguous sequence.

2. The method of claim 1, wherein the method is used for propagating computer instructions across a data network having a plurality of interconnected nodes to determine a complete specification of a data network topology, and the method further comprises:
instantiating, by a controller, a data array L that is forwarded to a first node that is designated as a present node;
instantiating, by the present node, a new data array D and recursively iterating over each network interface of an ordered set of network interfaces of the present node:
upon connecting to a child node through a network interface of the ordered set of network interfaces, forwarding a data array L to the child node, the child node recursively iterated as the first node;
upon identifying that the network interface of the ordered set of network interfaces is unoccupied, modifying data array D to represent that the network interface is unoccupied;
upon identifying that the ordered set of network interfaces includes no additional interfaces to be iterated across, forward the data array D to a parent node; and
receiving, by the controller, an updated version of the data array D, the updated version of the data array D representing the complete specification of the data network topology.

3. The method of claim 1, wherein the method is used for propagating computer instructions as bulk updates across a data network having a plurality of interconnected nodes, the method further comprising:
instantiating, by a controller, a composite data array that is comprised of a message type identifier and at least one data array for adjusting a state of the interconnected nodes, where a number of data arrays is equal to the number of nodes in the data network, and forwarding, by the controller, the composite data array to a first node designated as a present node, the present node recursively iterating over each occupied network interface of an ordered set of network interfaces of the present node:
upon identifying that there are remaining occupied network interfaces, identifying, by the present node, a number of nodes connected to an interface being iterated M;
starting, by the present node, of an internal clock;
forward the message type identifier and a first M data arrays of the composite data array to the interface being iterated wherein a child node receives an instruction set for recursion;
upon identifying, by the present node, that there are no remaining occupied network interfaces or there are no occupied network interfaces, create an acknowledgement data array to be forwarded to a parent node; and
receiving, by the controller, the acknowledgement data array indicative that the bulk update was completed.

4. The method of claim 1, further comprising creating an acknowledgement message after the sending of all contiguous sequences through the connected second network interfaces is complete, and sending the acknowledgement message through the first network interface of the node.

5. The method of claim 4, wherein a node pauses further execution of the transmission after sending a second contiguous sequence through a second network interface until at least one acknowledgement message is received through the same second network interface, wherein further execution of the transmission becomes conditional on successful transport to nodes prior in the determined order of the plurality of nodes.

6. The method of claim 5, wherein the method comprises generating an error message if a node of the data network fails to receive within a time threshold at least one acknowledgement message subsequent to the sending of a second contiguous sequence.

7. The method of claim 1, wherein the determined second order is obtained once for a data network, and is stored in memory, wherein the determined second order is retrieved from memory during the creation of the first composite data array and transmission of the first composite data array.

8. The method of claim 1, wherein the network interfaces are comprised of serial ports arranged in a geometrical relation corresponding to each node of the plurality of nodes.

9. The method of claim 8, wherein the order of the network interfaces of the node corresponds to a clockwise traversal or a counter-clockwise traversal of the geometrical relation of the serial ports.

10. The method of claim 1, wherein the nodes are further comprised of digital or analog sensors to sense one or more states of the node or the environment of the node, and wherein the sensed states are digitally represented as data arrays forming part of the first composite data array transmitted in the data network.

11. The method of claim 10, wherein the state sensed by the node is the presence or absence of an object in the close proximity of the node.

12. The method of claim 1, wherein the nodes are further comprised of actuators that are actuated wherein one or more states of the components are set as a function of parts of the content of the first composite data array received by the node through one or more of its network interfaces.

13. The method of claim 12, wherein the actuation of the node includes a setting of drive currents for a plurality of light-emitting diodes.

14. The method of claim 1, wherein the tree topology of the network topology is determined as a spanning tree of all network interface connections, wherein the connections of the spanning tree is a subset of all network interface connections.

15. The method of claim 1, wherein each node of the plurality of nodes is a luminaire or a luminaire controller circuit, and the transmission of the composite data array is utilized during propagation of control messages across the plurality of nodes.

16. The method of claim 15, wherein the control messages control at least an optical output characteristic of individual nodes of the plurality of nodes.

17. A method for transporting a data array in a data network comprising a plurality of nodes, and comprising a plurality of connections between nodes, wherein the data array transport is from one source node to one target node in the plurality of nodes;
wherein a node in the plurality of nodes is comprised of a plurality of network interfaces for sending and receiving data arrays, and
wherein the connections between nodes of the plurality of nodes are formed through pairwise joining of a plurality of network interfaces of the nodes, wherein the network topology of the connections is a tree topology;
the method comprising:
assigning a first order to the plurality of network interfaces for all nodes in the plurality of nodes;
determining a second order for the plurality of nodes as a function of the network topology and the first order for the plurality of network interfaces;
generating a first composite data array from a first data array and a first integer and a second integer, wherein the first integer is set as a function of the place of either the source node or target node within the determined order; and
transmitting the content of the first composite data array throughout the data network, wherein a node receives the first composite data array through a first network interface, and sends the first composite data array through a second network interface only if the addition of the second integer of the first composite data array and the number of nodes contained in a branch of the tree data network topology connected to the node through the second network interface exceeds the value of the first integer of the first composite data array;
wherein the second network interface is iteratively selected from the first order to the plurality of network interfaces for a node, and wherein the second integer of the first composite data array is incremented by the number of nodes contained in the branch of the tree data network topology connected to the node through the second network interface if the composite data array is not sent through the second network interface.

18. A data network comprising a plurality of nodes, and a plurality of connections between nodes, the plurality of nodes of the data network adapted for transport of data arrays throughout the data network;
each node of the plurality of nodes including a plurality of network interfaces for sending and receiving data arrays, and each node including a programmable integrated circuit and a memory;
the connections between nodes are formed through the pairwise joining of a plurality of network interfaces of the nodes, wherein a network topology of the connections is of a tree topology; and
the transport of data arrays throughout the data network utilizes the programmable integrated configured to:
assign a first order to the plurality of network interfaces for all nodes in the plurality of nodes;
determine a second order for the plurality of nodes as a function of the network topology and the first order for the plurality of network interfaces;
generate a first composite data array by a concatenation of a plurality of data arrays, wherein a first and a second data array in the first composite data array are in an equivalent order to each other as a corresponding pair of nodes in a second order; and
transmit the content of a first composite data array throughout the data network, wherein each node receives from at least one other node connected to it through a first network interface, a first contiguous sequence of the first composite data array, and wherein each node sends to other nodes connected to said each node through a second network interface a second contiguous sequence of the first composite data array, wherein the second contiguous sequences are constructed from the first contiguous sequence as a function of the first and second order;
wherein the function relating the first and second contiguous sequences of the first composite data array comprises at least one of:
(i) splitting the first contiguous sequence into a plurality of new sequences, equal or greater in number than a number of connected network interfaces of the node, and assigning the second contiguous sequence as a new sequence of the plurality of new sequences in an equivalent order relative to other new sequences as the second network interface to the other network interfaces in the first order; or (ii) aggregating a plurality of sequences of data arrays, equal or greater in number than the number of connected network interfaces of the node, wherein the second contiguous sequence is the sequence in an equivalent order relative to other overlapping or non-overlapping sequences as the second network interface to the other network interfaces in the first order, and assigning the aggregated sequences as the first contiguous sequence.

19. The data network of claim 18, wherein the plurality of nodes are provided as an interconnected set of luminaires, each luminaire operating as a node of a data network.

20. A data network comprising a plurality of nodes and a plurality of connections between nodes, the plurality of nodes of the data network adapted for transport of data arrays throughout the data network;

each node of the plurality of nodes including a plurality of network interfaces for sending and receiving data arrays, and each node including a programmable integrated circuit and a memory;

the connections between nodes are formed through the pairwise joining of a plurality of network interfaces of the nodes, wherein a network topology of the connections is of a tree topology; and the transport of data arrays throughout the data network is from one source node to one target node in the plurality of nodes utilizes the programmable integrated configured to:

assign a first order to the plurality of network interfaces for all nodes in the plurality of nodes;

determine a second order for the plurality of nodes as a function of the network topology and the first order for the plurality of network interfaces;

generate a first composite data array from a first data array and a first integer and a second integer, wherein the first integer is set as a function of the place of either the source node or target node within the determined order; and transmit the content of the first composite data array throughout the data network, wherein a node receives the first composite data array through a first network interface, and sends the first composite data array through a second network interface only if the addition of the second integer of the first composite data array and the number of nodes contained in a branch of the tree data network topology connected to the node through the second network interface exceeds the value of the first integer of the first composite data array;

wherein the second network interface is iteratively selected from the first order to the plurality of network interfaces for a node, and wherein the second integer of the first composite data array is incremented by the number of nodes contained in the branch of the tree data network topology connected to the node through the second network interface if the composite data array is not sent through the second network interface.

* * * * *